US012574432B2

(12) United States Patent
Soman et al.

(10) Patent No.: US 12,574,432 B2
(45) Date of Patent: Mar. 10, 2026

(54) GENERATING A SECURE UPLOAD URL AND GRANTING ACCESS TO A USER WITHIN A SECURE DOCUMENT SYSTEM

(71) Applicant: Chime Financial, Inc., San Francisco, CA (US)

(72) Inventors: Siddhi Soman, San Francisco, CA (US); Jose Roberto Cataneo Samano, San Francisco, CA (US); Saisi Peter, San Francisco, CA (US); William Stern, New York, NY (US)

(73) Assignee: Chime Financial, Inc., San Francisco, CA (US)

( * ) Notice: Subject to any disclaimer, the term of this patent is extended or adjusted under 35 U.S.C. 154(b) by 239 days.

(21) Appl. No.: 18/484,231

(22) Filed: Oct. 10, 2023

(65) Prior Publication Data

US 2024/0121290 A1 Apr. 11, 2024

Related U.S. Application Data

(60) Provisional application No. 63/378,823, filed on Oct. 7, 2022.

(51) Int. Cl.
| | |
|---|---|
| *H04L 67/06* | (2022.01) |
| *G06F 21/62* | (2013.01) |
| *H04L 9/08* | (2006.01) |
| *H04L 9/40* | (2022.01) |

(52) U.S. Cl.
CPC .......... *H04L 67/06* (2013.01); *G06F 21/6218* (2013.01); *H04L 9/0819* (2013.01); *H04L 63/10* (2013.01); *G06F 2221/2141* (2013.01)

(58) Field of Classification Search
CPC ....... H04L 67/06; H04L 9/0819; H04L 63/10; G06F 21/6218
USPC ............................................................ 726/2
See application file for complete search history.

(56) References Cited

U.S. PATENT DOCUMENTS

| | | | | |
|---|---|---|---|---|
| 2008/0039058 A1* | 2/2008 | Ray | .......................... | H04L 67/04 |
| | | | | 455/414.3 |
| 2008/0207233 A1* | 8/2008 | Waytena | ............... | H04L 65/612 |
| | | | | 455/466 |
| 2014/0067929 A1* | 3/2014 | Kirigin | ................... | H04L 67/06 |
| | | | | 709/204 |
| 2015/0032840 A1* | 1/2015 | Daly, Jr. | ............... | H04L 63/102 |
| | | | | 709/216 |

FOREIGN PATENT DOCUMENTS

| | | | | | |
|---|---|---|---|---|---|
| CN | 115481413 A | * | 12/2022 | ............. | G06F 21/62 |

* cited by examiner

*Primary Examiner* — Zi Ye
(74) *Attorney, Agent, or Firm* — Keller Preece PLLC

(57) ABSTRACT

The present disclosure relates to systems, non-transitory computer-readable media, and methods for generating a secure upload URL, receiving a file upload to a first draft data store, and transferring the file from the first draft data store to a first final data store. In particular, in one or more embodiments, the disclosed systems transfers the file from the first draft data store to a first final data store based on the file meeting predetermined file attributes associated with the first draft data store. Moreover, the disclosed system provides to an agent device access to the file based on access permissions corresponding to the first final data store.

20 Claims, 11 Drawing Sheets

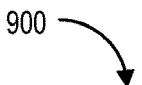

900

Receiving, From A Client Device, An Upload Request Comprising Information Associated With A File *902*

Based At Least In Part On The Information Associated With The File, Generating A Secure Upload URL *904*

Providing The Secure Upload URL To The Client Device For The Client Device To Upload The File To A First Draft Data Store *906*

Transferring The File From The First Draft Data Store To A First Final Data Store Based On The File Meeting Predetermined File Attributes Associated With The First Draft Data Store *908*

Providing, To An Agent Device, Access To The File Based On Access Permissions Corresponding To The First Final Data Store *910*

*Fig. 9*

GENERATING A SECURE UPLOAD URL AND GRANTING ACCESS TO A USER WITHIN A SECURE DOCUMENT SYSTEM

CROSS-REFERENCE TO RELATED APPLICATIONS

This application claims the benefit of, and priority to U.S. Provisional Application No. 63/378,823, filed on Oct. 7, 2022. The aforementioned application is incorporated by reference in its entirety.

BACKGROUND

Recent years have seen significant improvements in communications between institutional computer systems and client devices of users. For example, existing systems can provide a client device with a means to communicate with an institution computer system via email or text message. To illustrate, existing systems can receive files from a client device through email or text message as a convenient method for the client device to transmit files and other information.

Although existing systems can provide email and other communication means as a way for receiving files from client devices to institutional computing systems, such systems have a number of problems in relation to security, efficiency, and accuracy. For instance, existing systems often lack security measures with respect to files received from client devices. Specifically, after receiving a file from a client device, an agent device (e.g., a computer within the institutional computing system) can download the file for malicious purposes because there are little restrictions on how an individual can access and use an attachment to an email. For example, in existing systems, after an agent device receives a file from a client device of a user, the file can be forwarded to any other device. To elaborate, in existing systems an agent device can receive a sensitive file from a client device of a user. The agent device may determine that another agent device needs the sensitive file and proceeds to forward the sensitive file. The agent device that subsequently receives the sensitive file can then forward it on or save it. The propagation of sensitive documents through email or text messages further compromises security in existing systems by creating multiple instances of the sensitive file throughout various systems. Moreover, existing systems also suffer in relation to securely storing sensitive files. Existing systems typically store sensitive files across agent devices and the agent device may not have controls limiting the sharing of the sensitive file.

While the above paragraph focuses on the lack of security for sensitive information sent from a client device of a user to the institutional computing system, existing systems also include vulnerabilities based on potentially receiving malicious files from client devices meant to disrupt or harm the institutions computing systems. For example, receiving files within email or text messages can expose existing systems to a malicious attack when an agent device opens or otherwise executes an attached file. Accordingly, existing computing systems often lack a secure way to receive files from client devices associated with users that both securely store user sensitive information as well as protect the institutional computer system from malicious attacks.

In addition to problems with security, existing systems suffer from inefficiencies. Existing systems suffer from inefficiently using multiple graphical user interfaces for client devices to send a file to the institutional computing system. For example, from the perspective of the client device, a user typically is in a first application or program to connect with the institution. Upon reaching a point where the client device needs to provide a file, the user typically must navigate through multiple graphical user interfaces to open or access different applications (email or text) and then navigate various additional steps to identify files and to send those files to an agent device within the institutional system. Furthermore, from the perspective of an agent device, an agent must navigate various steps through multiple graphical user interfaces to access, download, name, organize, and store the files. Accordingly, existing systems provide inefficient interfaces to receive, store, and manage files received for client devices of users.

Moreover, existing systems can receive a plurality of attached files in an email that are inefficiently named and formatted. As such, existing systems use computational resources such as processing power to sort relevant files from irrelevant ones. Existing systems also expend computational memory to store potentially irrelevant files. Additionally, the incorrect agent devices can receive a file and the existing system would need to utilize processing power to determine which agent device the file should have been sent to. These things cause delays and further burdens the computational resources in existing systems.

BRIEF SUMMARY

Embodiments of the present disclosure provide benefits and/or solve one or more of the foregoing or other problems in the art with systems, non-transitory computer-readable media, and methods for selectively providing to an agent device access to a file based on permissions corresponding to a final data store and the agent device. For example, the disclosed system generates and provides a secure upload URL to a client device to upload a file to a draft data store. The disclosed system transfers the file from the draft data store to the final data store based on the file meeting predetermined file attributes associated with the draft data store to ensure the file meets security and content standards. Subsequent access is provided to the agent device based on access permissions corresponding to final data store and the agent device.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIG. 9 illustrates an example series of acts for providing access to one or more agent devices in accordance with one or more embodiments.

DETAILED DESCRIPTION

Figure 1:
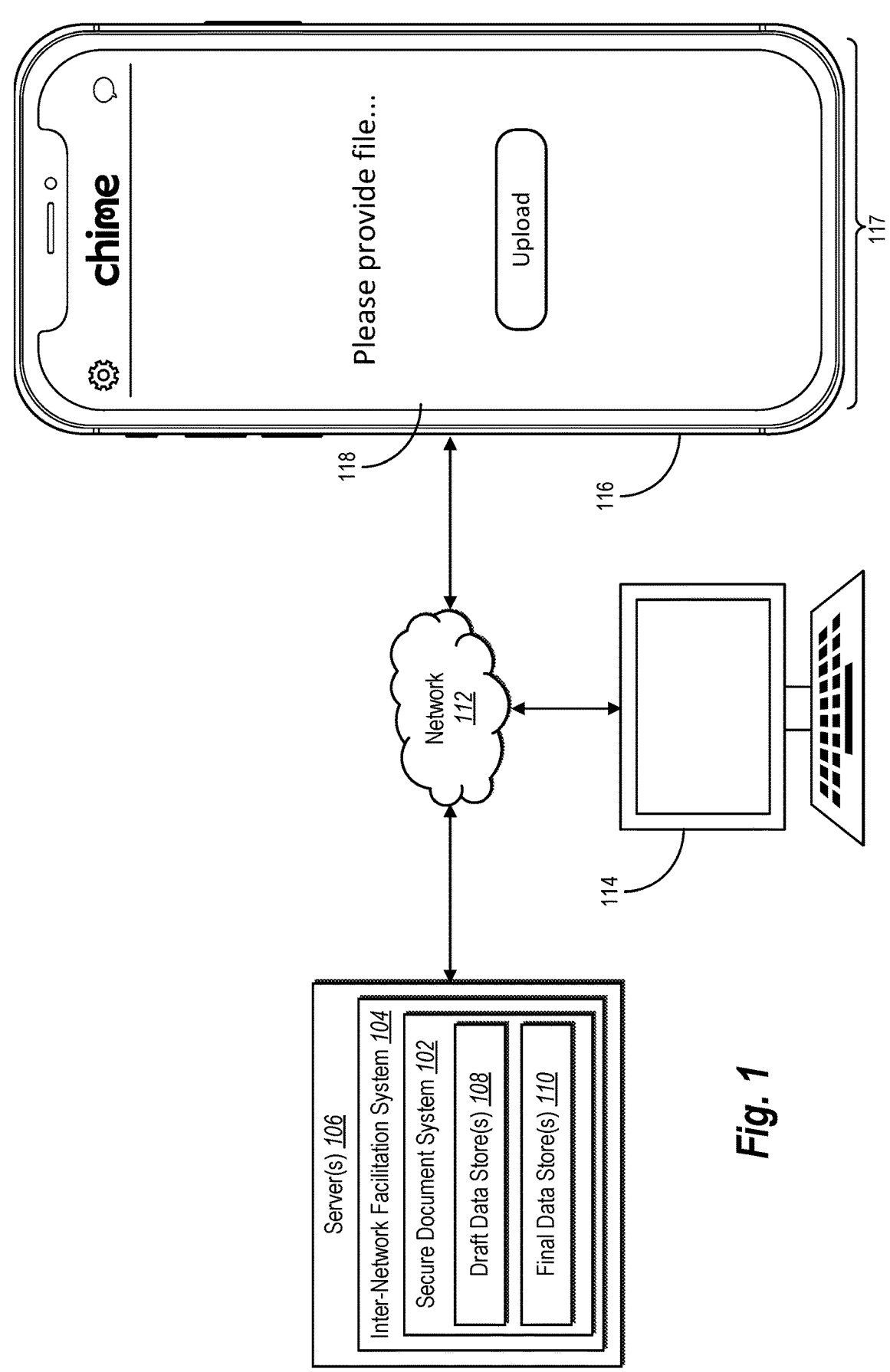
FIG. 1 illustrates a diagram of an environment in which a secure document system can operate in accordance with one or more embodiments.

This disclosure describes one or more embodiments of a secure document system that generates a secure upload URL for a client device to upload a file to a first draft data store, process the file in the first draft data store and transfer the file to a first final data store based on predetermined file attributes associated with the first draft data store being satisfied. For example, the secure document system receives a request from a client device to upload the file. The request received by the secure document system includes information associated with the file and based on that information, the secure document system generates a secure upload URL. The secure document system provides the secure upload URL to the client device and the client device uploads the file to the first draft data store associated with the secure access URL. The secure document system transfers the file from the first draft data store to a first final data store based on the file satisfying predetermined file attributes associated with the first draft data store. The secure document system then provides access of the file in the final data store to an agent device based on access permissions corresponding to the first final data store. Additionally, the secure document system identifies the first draft data store for the upload request based on a content category of the upload request. Moreover, the secure document system can provide access to an agent device via providing an authorization key to agent devices for use in an API call or by providing a permanent secure access URL and logging access to the file.

As mentioned above, the secure document system generates a secure access URL. In particular, the secure document system in generating the secure access URL identifies the first draft data store from a plurality of draft data stores based on a content category. In particular, the client device sends content category metadata to the secure document system. To illustrate the secure document system receives metadata that indicates the client device's upload request relates to uploading a picture of a driver's license. Based on the upload request relating to uploading a picture of a driver's license, the secure document system identifies the first draft data store from a plurality of draft data stores.

As just discussed, the secure document system identifies the first draft data store based on content categories. In addition to the secure document system associating the first draft data store with a content category, each of the plurality of draft data stores can have different predetermined file attributes associated with it. To illustrate, the secure document system can determine that the first draft data store has predetermined file attributes that are different from predetermined file attributes of a second draft data store. This can for example include, the first draft data store receiving PDF files while the second draft data store receives JPEG files.

Furthermore, as the secure document system receives the uploaded file in the first draft data store, the secure document system can then process the file according to the predetermined file attributes associated with the first draft data store. In particular, the secure document system determines the file name, whether a file size of the file exceeds a predetermined threshold, file content, and the type of file uploaded. To illustrate, if the client device uploads a second file and the second file does not satisfy at least one of the predetermined file attributes for the first draft data store, then the secure document system does not transfer the second file to the first final data store. If the second file satisfies the predetermined file attributes for the first draft data store, then the secure document system transfers the file to the first final data store. Transferring the second file to the first final data store can include duplicating the second file in the first draft data store to the first final data store.

As discussed, the secure document system can receive the file in the first draft data store. In particular, the secure document system can determine a period to store the file in the first draft data store. After the secure document system determines a period to store the file and that period has passed, the secure document system can then remove the file from the first daft data store. To illustrate, the secure document system can set a period of 30 minutes to keep the file in the first draft data store before removal.

As mentioned above, the secure document system can provide the agent device with an authorization key for making API calls. In particular, the agent device with an authorization key can include it in the header of an API call and the secure document system can return a secure access URL to the agent device for access to the file associated with the secure access URL. To illustrate, the secure access URL provided to an agent device in response to an API call can include a temporary URL that redirects the agent device to the file. Accordingly, the temporary URL expires after a set period.

In addition to the authorization key for making API calls, the secure document system can provide a permanent secure access URL with a key to a second agent device and assign agent conditions to the first final data store. In particular, the secure document system provides the permanent secure access URL to the second agent device with a key that points to a storage location of the first final data store. To illustrate, the secure document system determines whether the second agent device satisfies agent conditions such as utilizing a VPN. If the agent conditions are satisfied, the secure document system returns the requested file to the second agent device via a temporary secure access URL.

As also mentioned above, the secure document system logs file access of the files accessed by the agent device. In particular, when the agent device uses an authorization key and API call or a permanent secure access URL, the secure document system can log the agent device that accessed the file or attempted to access the file. To illustrate, the secure document system can log the time, agent device ID, file accessed, and other conditions of the agent device.

Moreover, the secure document system can label the file on the first final data store. In particular, the secure document system labels the file in the first final data store based on file name, file size, file type, or content category. To illustrate, the secure document system provides access to the file in the first final data store based on an agent device being pre-authorized to access specific labels. Accordingly, if the agent device has pre-authorization for label X, then the agent device can access files in a final data store with label X.

The secure document system provides many advantages and benefits over existing systems and methods. For example, by receiving, from a client device, an upload request comprising information associated with a file, the secure document system improves security relative to existing systems. Specifically, the secure document system receiving upload requests rectifies issues relating to clients sending sensitive information over email or text to an agent device. Uploading documents directly with the secure document system eliminates the propagation of sensitive files through email or text message. The secure document system can act as a central repository for organizing and distributing files instead of allowing for individual agent devices to receive and move files around.

Further, by transferring the uploaded file from a first draft data store to a first final data store based on the file meeting predetermined file attributes associated with the first draft data store, the secure document system improves security. This improves security because the secure document system prevents malicious files from being uploaded directly to an agent device. Moreover, providing access to an agent device based on access permissions corresponding to the first final data store improves security by allowing the secure document system to track access of files and control access of files.

In addition to improving security, the secure document system also improves efficiency. For example, by receiving, from a client device, an upload request comprising information associated with a file, the secure document system improves efficiency relative to existing systems. Rather than using multiple graphical user interfaces (device application, web browser, email, etc.), the secure document system allows file uploads in a device application. Thus, a user of the device application can directly upload their sensitive documents via the device application instead of using multiple interfaces to send their sensitive files. Furthermore, agent devices receive files via the secure document system and do not have to name, organize, or determine where to store files. Accordingly, the secure document system reduces the number of graphical user interfaces used by agent devices and users of client devices.

In continuing with efficiency, by generating the secure upload URL and providing the secure upload URL to the client device for the client device to upload the file to a first draft data store, the secure document system improves efficiency. Rather than receiving files with unformatted names and incorrect file types, the secure upload URL points the device application to a specific draft data store for uploading the file. Each draft data store has predetermined file attributes for files uploaded to it. This allows the secure document system to efficiently categorize files, label files, and provide file access to agent devices. Accordingly, the secure document system reduces the amount of processing power, computational power, memory on computational systems and time spent on storing, organizing, distributing, and providing access to files.

In addition to security and efficiency, the secure document system also improves accuracy. For example, by using draft data stores and providing access to agent devices based on access permissions corresponding to final data stores, the secure document system improves accuracy relative to existing systems. Rather than receiving files named incorrectly or formatted incorrectly, the secure document system uses draft data stores with predetermined file attributes and transfers files in draft data stores to final data stores in response to the file satisfying predetermined file attributes. This allows the secure document system to identify issues with files before giving access to agent devices. This helps ensure that the secure document system can distribute files to the correct agent device and eliminates the need for agent devices to determine a storage location for a file. As such, the secure document system improves accuracy over existing systems and frees up additional computational resources.

As illustrated by the foregoing discussion, the present disclosure utilizes a variety of terms to describe features and advantages of the secure document system. Additional detail is now provided regarding the meaning of such terms. For example, as used herein, the term "upload request" refers to the client device selecting an option to upload a file and the client device selecting one or more files. In particular, the term upload request can include the client device selecting an option to upload a file within a device application and selecting a file associated with an account update.

For example, as used herein, the term "secure upload URL" refers to a URL that indicates a location and information associated with a file. In particular, the term secure upload URL can include a temporary URL with a unique identifier provided to the client device to instruct the file to be uploaded to a specific location. The secure upload URL can indicate information such as content category metadata of the client device. To illustrate, a secure upload URL can include a pre-signed URL.

For example, as used herein, the term "secure access URL" refers to a URL that indicates a storage location and information associated with a file. In particular, the term secure access URL can include a temporary URL or a permanent URL. To illustrate, the secure document system can return a secure access URL to an agent device and the agent device can use the secure access URL to access a file associated with the secure access URL.

For example, as used herein, the term "permanent secure access URL" refers to a URL for a file with a signed ID that is difficult to guess and does not expire. In particular, the "permanent secure access URL" points to a file in a final data store and is only accessible under certain agent conditions. To illustrate, when an agent device uses a permanent secure access URL, the secure document system redirects the agent device to a file via a secure access URL which expires after a set period.

For example, as used herein, the term "draft data store" refers to a data structure for provisionally storing files. In particular, the term draft data store refers to a data structure with predetermined factors such as a specific file type, file size, file content, or file name. To illustrate, the secure document system receives an uploaded file for storage in a draft data store. The secure document system identifies the draft data store based on a content category of the file. Moreover, each of a plurality of draft data stores can include different predetermined file attributes.

For example, as used herein, the term "final data store" refers to a data structure that receives transferred files from the aforementioned draft data store. In particular, the term final data store refers to a data structure with predetermined file attributes that correspond with a draft data store. To illustrate, the secure document system uploads a file onto a draft data store and processes the file. If the file satisfies predetermined file attributes, then the secure document system transfers the uploaded file into a final data store that corresponds to the draft data store.

For example, as used herein, the term "agent conditions" refers to pre-established situations an agent device must satisfy prior to accessing a file from a final data store. In particular, agent conditions can include an agent device using a VPN when accessing a file. The secure document system determines whether the agent conditions are satisfied prior to returning a file to the agent device. To illustrate, agent conditions can further include an established time of access, the use of a specific application by an agent device, and a threshold limit for maximum number of times a file can be accessed.

For example, as used herein, the term "logging" refers to the secure document system recording file access and file access attempts. In particular, when an agent device retrieves or attempts to retrieve a file, the secure document system records the time, agent device, file, and other conditions. To illustrate, the secure document system can record that agent device 1 attempted to access file X at 3:00 a.m. but access was denied because agent device 1 did not use the appropriate VPN.

For example, as used herein, the term "labeling" refers to the secure document system classifying a file. In particular, labeling refers to the process of the secure document system placing categorizations on files where the categories correspond with pre-authorized categories an agent device can access. To illustrate, if an agent device can access all dispute type files, then if a file is labeled as "dispute type: unauthorized transaction" the agent device can access the file.

Additional detail regarding the secure document system will now be provided with reference to the figures. In particular, FIG. 1 illustrates a block diagram of a system environment for implementing a secure document system 102 in accordance with one or more embodiments. As shown in FIG. 1, the environment includes server(s) 106 implementing the secure document system 102 as part of an inter-network facilitation system 104. The environment of FIG. 1 further includes a client device 116, a device application 117, a graphical user interface 118 of the client device 116, and an agent device 114. The server(s) 106 can include one or more computing devices to implement the secure document system 102. Moreover, as illustrated, the secure document system 102 includes draft data store(s) 108 and final data store(s) 110. Additional description regarding the illustrated computing devices (e.g., the server(s) 106, the agent device 114 and/or the client device 116) is provided with respect to FIGS. 10-11 below.

As shown, the secure document system 102 utilizes the network 112 to communicate with the client device 116, and/or the agent device 114. The network 112 may comprise a network as described in relation to FIGS. 10-11. For example, the secure document system 102 communicates with the client device 116 to provide and receive information pertaining to various client transactions and communicates with the agent device 114 for uploading files and providing access to files. Indeed, the inter-network facilitation system 104 or the secure document system 102 can receive an uploaded file in the draft data store(s) 108, transfer the uploaded file into the final data store(s) 110 and provide access of the uploaded file to the agent device 114.

In one or more embodiments, the inter-network facilitation system 104 communicates with the client device 116 or the agent device 114 in response to receiving an uploaded file. In particular, the inter-network facilitation system 104 provides an indication of a secured account associated with a digital account to indicate that the client device 116 is authorized to upload information pertaining to the digital account. In addition, the inter-network facilitation system 104 communicates with the client device 116 and the agent device 114 to determine permissions of the client device 116. For example, the inter-network facilitation system 104 provides information to the secure document system 102 such as direct deposit status, transaction information, digital account updates, device fee information, check status, interaction history, transaction status, activation, etc.

As shown, the secure document system 102 uses draft data store(s) 108 and final data store(s) 110 to facilitate the uploading of files from the client device 116. As indicated by FIG. 1, the client device 116 includes the device application 117. In particular, the device application 117 can include a web application, a native application installed on the client devices 116 (e.g., a mobile application, a desktop application, etc.), or a cloud-based application where all or part of the functionality is performed by the server(s) 106. In some embodiments, the inter-network facilitation system 104 or the secure document system 102 communicates with the client device 116 through the device application 117. This communication for example, receives and provides account information and transaction information including direct deposit status, digital account updates, device fee information, check status, interaction history, transaction status, activation, etc. As shown, the secure document system 102 can provide options to upload files, digital account information and secured account information for display within the graphical user interface 118 associated with the device application 117.

As shown in FIG. 1, the client device 116 implements the device application 117 in conjunction with interaction with the inter-network facilitation system 104 or the secure document system 102. For example, the inter-network facilitation system 104 or the secure document system 102 can monitor the activities of the device application 117. In particular, these activities can include events such as time spent on device application 117, recently viewed pages on device application 117, recently viewed transaction on the device application 117, attempted dispute requests, account updates, etc.

Although FIG. 1 illustrates the environment having a particular number and arrangement of components associated with the secure document system 102, in some embodiments, the environment may include more or fewer components with varying configurations. For example, in some embodiments, the inter-network facilitation system 104 or the secure document system 102 can communicate directly with the client device 116, and/or the device application 117, bypassing the network 112. In these or other embodiments, the inter-network facilitation system 104 or the secure document system 102 can be implemented (entirely on in part) on the client device 116. Additionally, the inter-network facilitation system 104 or the secure document system 102 can include or communicate with a database for storing information, such as recent direct deposits, ATM withdrawals, debit, or credit transactions, pending transactions, digital account updates, interaction history, and/or other information described herein.

Figure 2:
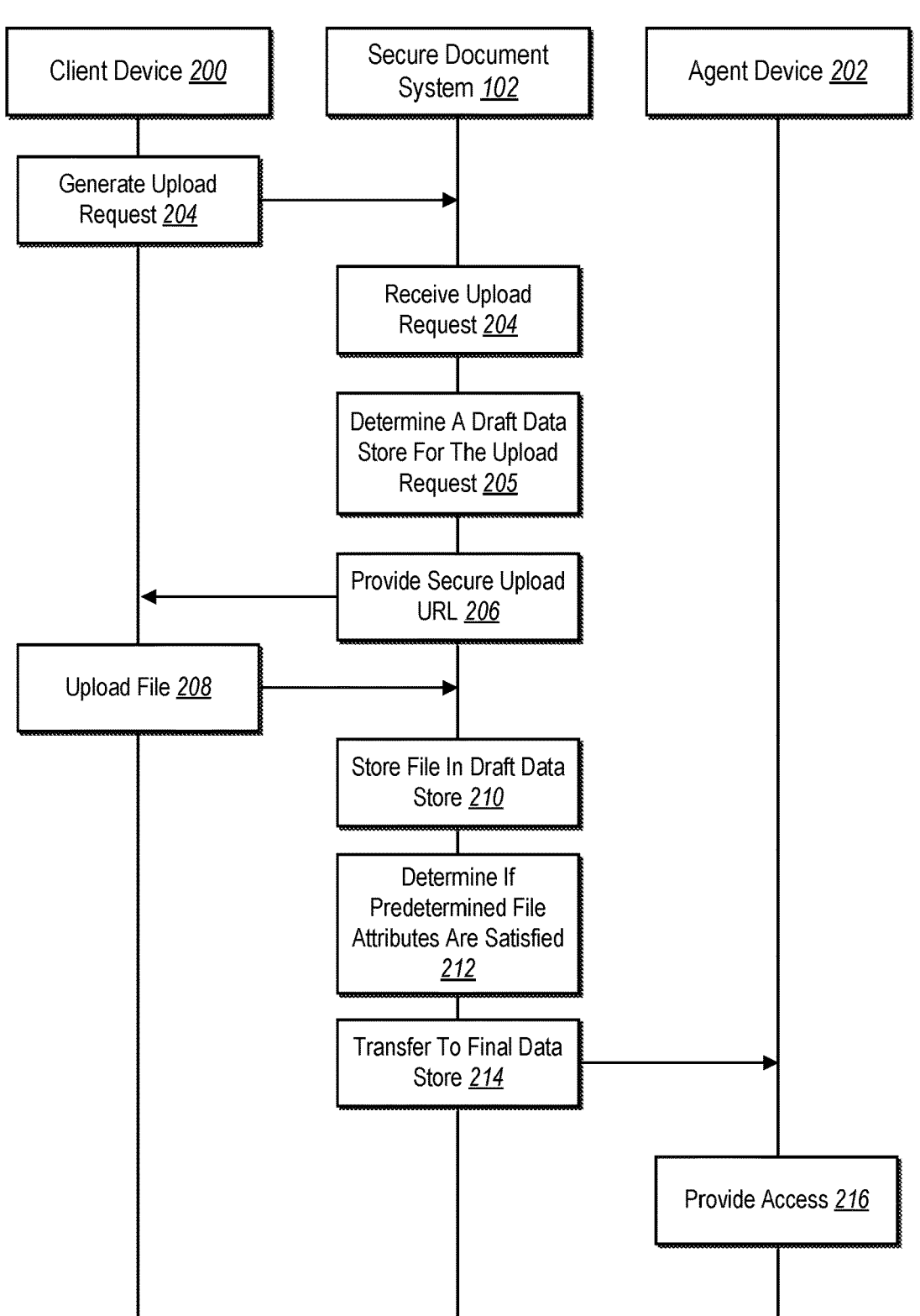
FIG. 2 illustrates a wire diagram of the secure document system providing access to an agent device in accordance with one or more embodiments.

As discussed above, the secure document system 102 can provide access to an agent device based on access permissions corresponding to the first final data store. For instance, FIG. 2 illustrates the secure document system 102 providing access to a file in accordance with one or more embodiments. Specifically, FIG. 2 shows a client device 200 generating an upload request 204. The secure document system 102 receives the upload request 204 with information corresponding to the upload request 204 and performs an act 205 of determining a draft data store for the upload request. The secure document system 102 provides a secure upload URL 206 to the client device 200. With the secure upload URL 206, the client device 200 uploads a file 208. The secure document system 102 receives the file 208 and stores the file in a draft data store 210. The secure document system 102 then performs an act 212 of determining if predetermined file attributes of the draft data store 210 are satisfied, if the predetermined file attributes are satisfied then the secure document system 102 transfers the file 208 to a final data store 214. Subsequent to transferring the file 208 to the final data store 214, the secure document system 102 performs an act 216 of providing access to the file 208 to an agent device 202.

As mentioned, the client device 200 generates the upload request 204. For example, the upload request 204 occurs when a user of the client device 200 indicates via the device application (e.g., device application 117 as discussed in FIG. 1) that the user wants to upload the file 208. In particular, the user selecting an option to upload the file 208 can occur when the user selects an option "upload file" in a graphical user interface (e.g., graphical user interface 118 as discussed in FIG. 1) of the device application. To illustrate, in one or more implementations, the client device 200 selects an option to upload file(s) in response to a request from the secure document system 102 for photo identification, proof of address, change of name documentation, photos of social security number, dispute forms, receipts, and other evidence related to disputes or account updates.

As discussed above, the secure document system 102 receives the upload request 204. For example, the secure document system 102 receives metadata information from the client device 200 regarding the upload request 204. In particular, the metadata information of the file 208 can include metadata of a content category identified within the upload request 204. In one or more implementations, the secure document system 102 links the content category with the graphical user-interface of the client device 200. To illustrate, if a user of the client device 200 disputes a transaction, the secure document system 102 can send a request the client device 200 to upload receipts related to the disputed transaction. The metadata of a content category sent to the secure document system 102 in this situation involves "disputed transaction." Whereas, if the secure document system 102 determines that the user of the client device 200 should upload personal identification, then the metadata of a content category sent to the secure document system 102 would involve "personal identification" or "account updates."

As mentioned, the secure document system 102 uses the metadata of a content category identified within the upload request 204 to identify a draft data store. For example, the content categories can include categories related to disputed transactions or account updates. In particular, the secure document system 102 in response to receiving metadata of content categories identifies a draft data store that corresponds with a specific content category. To illustrate, if the identified content category is "social security number" then the secure document system 102 generally identifies draft data stores related to account updates and specifically identifies a draft data store for "social security number." More details relating to how the secure document system 102 utilizes content categories to identify draft data stores is discussed in FIG. 3.

As previously mentioned, the secure document system 102 generates the secure upload URL 206 and provides it to the client device 200. For example, the secure upload URL 206 points to a draft data store and contains metadata information of the content category associated with the upload request 204 and can also include a limit on the number of files uploaded to the specified draft data store. In particular, when the client device 200 generates the upload request 204, the device application of the client device 200 sends the secure document system 102 a request to generate the secure upload URL 206. To illustrate, the client device 200 uses the secure upload URL 206 and uploads the file 208 associated with the upload request 204 to the draft data store 210 indicated by the secure upload URL 206.

Further, in regard to the secure document system's 102 document limit, the secure document system 102 can validate that the number of files selected by the client device 200 for upload do not exceed a maximum limit established by the secure document system 102. In particular, the secure document system 102 signs the secure upload URL 206 with the threshold for maximum number of files. In one or more embodiments, the signature on the secure upload URL 206 indicating the maximum number of files can vary based on the content category metadata. To illustrate, the signature on the secure upload URL 206 for the threshold of maximum number of files, allows the secure document system 102 to automatically reject uploads that exceed 10 files.

In one or more implementations, after the client device 200 has uploaded the file 208, the client device 200 can issue a request to delete the file 208 from the draft data store 210. For example, the client device 200 can issue a delete request in response to the secure document system 102 indicating that the client device 200 has exceeded a threshold of maximum number of files. In particular, if a client sends a delete request but still uploads a file, the secure document system 102 ignores the uploaded file. After a predetermined period, the secure document system 102 deletes files uploaded to the draft data store 210.

Moreover, the upload request 204 can include a support ticket ID that references the client device's 200 prior inquiry. To illustrate, the support ticket ID can indicate a dispute request from the client device 200 and the status of the dispute request. The secure upload URL 206 can include an indicator that points to the support ticket ID for later reference by agent devices of the secure document system 102.

In one or more implementations, the secure upload URL 206 provided to the client device 200 is temporary and expires after 5 minutes. In particular, the secure document system 102 provides the secure upload URL 206 with an embedded authorization key to the client device 200. As mentioned, the secure upload URL 206 indicates the draft data store 210 for the file 208. The secure upload URL 206 acts as an upload preset URL. To illustrate, the client device 200 via the device application receives the secure upload URL 206 as an upload preset URL and utilizes a library on the device application to read the secure upload URL 206 and determine which draft data store to upload the file 208 onto.

Additionally, the secure upload URL 206 can include a unique identifier provided to the device application and the secure document system 102 can also keep record of the unique identifier. To illustrate, in response to successfully uploading the file 208, the device application may indicate on the graphical user interface, "successful upload ID: 2245." Note that secure access URLs (as opposed to secure upload URLs) are discussed in FIGS. 5, 6, and 7.

As discussed above, the secure document system 102 stores the file 208 in the draft data store 210. For example, the draft data store 210, as discussed above, acts as a "draft" store, and awaits further decision making on the part of the secure document system 102. Details relating to the draft data store 210, such as predetermined file attribute requirements, are further discussed in FIGS. 3 and 4.

Figure 4:
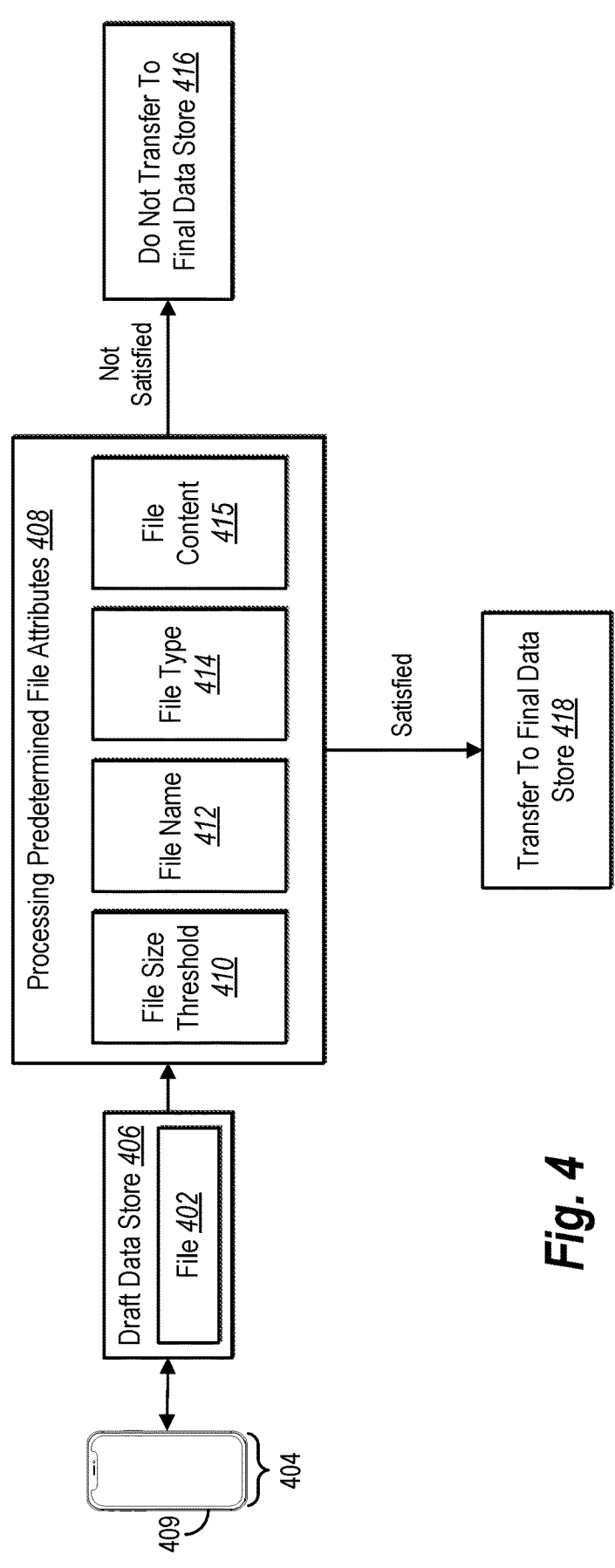
FIG. 4 illustrates an example diagram of the secure document system processing predetermined file attributes for a file in a draft data store in accordance with one or more embodiments.

As discussed above, transferring the file 208 from the draft data store 210 to the final data store 214 is discussed in more detail in FIG. 4. While performing the act 216 of providing access of the file 208 to the agent devices 202 is discussed in more detail in FIGS. 5 and 6. Other activities performed by the secure document system 102 such as logging, and labeling are discussed in more detail in FIG. 7 and FIG. 8.

Although FIG. 2 illustrates the method of uploading the file 208 and providing access to the agent device 202, these events can occur in a variety of ways. In one or more implementations regarding the upload request 204, the client device 200 sends an upload request 204 to the secure document system 102 via an API endpoint. In particular, the upload request via the API endpoint indicates that the user of the client device 200 wants to attach a document as additional evidence for an account update or a dispute request. As mentioned above, the secure document system 102 receives information through the API endpoint such as a metadata content category. The secure document system 102 at the initial upload could also check for general information such as the file size is >0 or that the initially determined content category matches the current content category. Further, in this instance, the secure document system 102 can generate a signature in response to the upload request 204 to ensure that a file actually uploaded by the client device 200 matches the file associated with the upload request 204.

Figure 3:
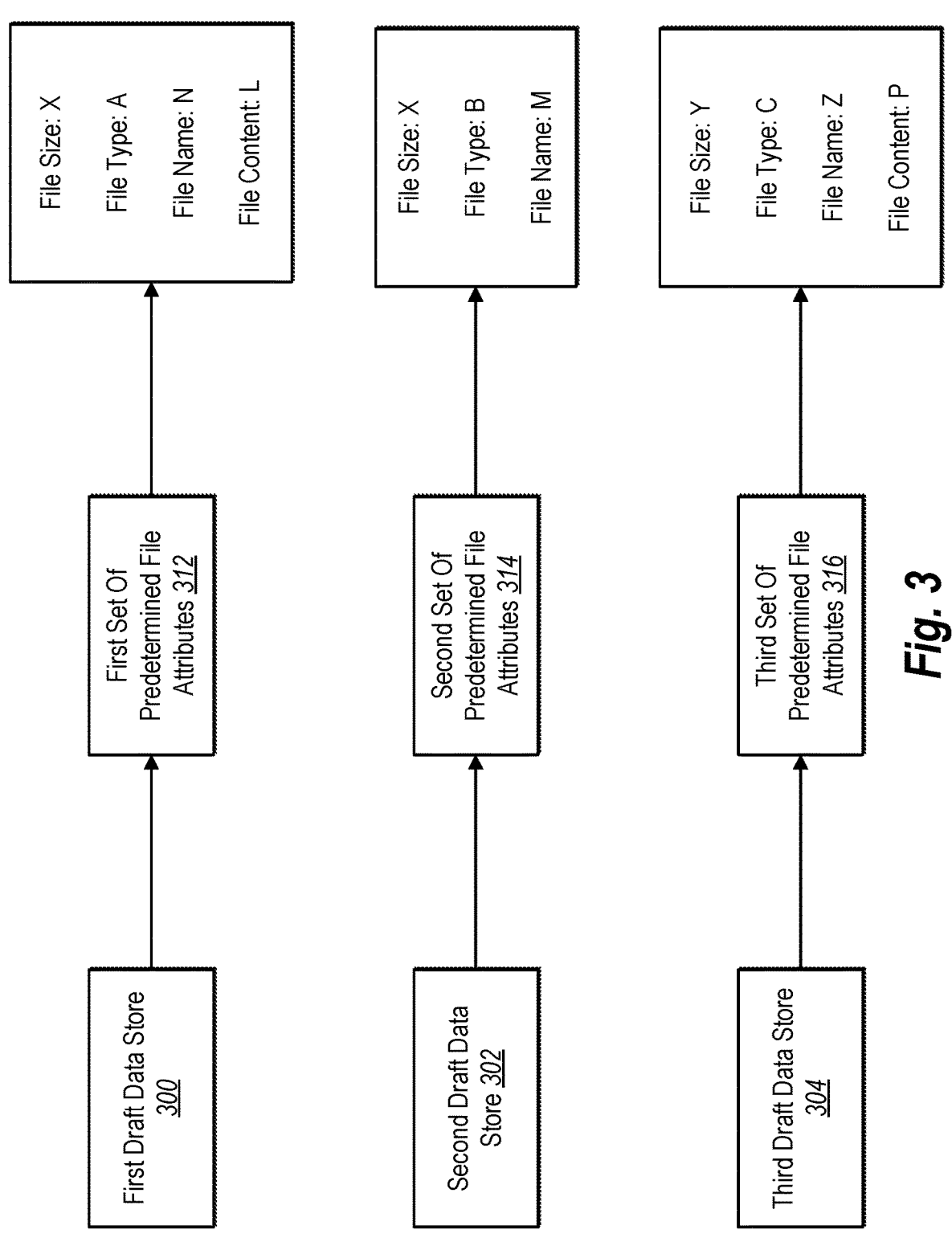
FIG. 3 illustrates an example diagram of the secure document system assigning predetermined file attributes for different draft data stores in accordance with one or more embodiments.

As discussed above, the secure document system 102 performs the act 212 of determining if predetermined file attributes are satisfied. For instance, FIG. 3 illustrates the secure document system 102 assigning predetermined file attributes to different draft data stores. Specifically, FIG. 3 shows a first draft data store 300 assigned a first set of predetermined file attributes 312 and the subsequent requirements for file size, file type, file content, and file name.

As mentioned, the secure document system 102 has a plurality of draft data stores and each draft data store can include different predetermined file attributes. For example, the plurality of draft data stores allows the secure document system 102 to segment files into different stores as drafts and subsequently transfer those files into final data stores (which is discussed in FIG. 4). In particular, the plurality of draft data stores with different requirements increases accuracy, efficiency, and flexibility in the secure document system 102. To illustrate, each of the plurality of draft data stores can include different policies, restrictions, and retention periods. As shown in FIG. 3. a first set of predetermined file attributes 312, a second set of predetermined file attributes 314, and a third set of predetermined file attributes 316, can contain a combination of the predetermined file attributes discussed below.

The secure document system 102 can set file size attributes uniformly across draft data stores or it can set file size attributes to vary across different draft data stores. In one or more implementations, the secure document system can uniformly determine that all draft data stores can receive files in a range. In particular this range could include 700 KB to 10 MB. Or the secure document system 102 can determine that the max supported file size is 20 MB. Additionally, the secure document system 102 can have a total upload request memory capacity. To illustrate, this can include a max upload requirement of 60 MB (e.g., 3 files at 20 MB each). Alternatively, the secure document system 102 can determine that only the first draft data store 300 contains the aforementioned file size attributes.

In addition to the size requirements, the secure document system 102 can implement experience limits to apply uniformly or to vary amongst different draft data stores. For example, experience limits can include restricting the first draft data store 300 from receiving more than 10 documents in a single upload request from a client device (e.g., client device 200 as discussed in FIG. 2). Furthermore, another example can include limiting the first draft data store 300 from receiving more than 10 uploads per hour from the same client device.

The secure document system 102 can implement file type requirements either uniformly across all draft data stores or to vary across different draft data stores. In one or more implementations, the secure document system 102 can determine for the first draft data store 300 that only JPEG files are allowed. While the secure document system 102 can determine that if the second draft data store 302 relates to support requests (i.e., issues within the device application) JPEG files, video files and document files (.doc, .pdf, etc.) are allowed.

To illustrate, the secure document system 102 can assign the first draft data store 300 to only receive PDF files while a second draft data store 302 can receive JPEG, PDF, and PNG files. Moreover, the secure document system 102 can merely require that a certain draft data store does not accept a specific type of file (e.g., .exe or .doc). Also, the secure document system 102 can determine for example, that the first draft data store 300 and second draft data store 302 have overlapping predetermined file attributes.

The secure document system 102 can set file name requirements within a draft data store and/or assign predetermined file attributes to a draft data store based on the name assigned to a draft data store. Similar to the other predetermined file attributes, the name requirements can apply uniformly to all draft data stores or can vary amongst different draft data stores. For example, if the secure document system 102 uses a draft data store specifically for unauthorized transactions, the secure document system 102 can name the draft data store to reflect this. In particular, as mentioned above, the name of the draft data store can impose certain requirements, such as all file names uploaded to the draft data store must have "unauthorized" in the file name. Additionally, if the secure document system 102 names a draft data store "dispute-request-unauthorized" then the secure document system 102 can automatically apply predetermined file attributes to that draft data store such as the file size can include only .PDF or .JPEG.

In one or more implementations, the secure document system 102 can use prefixes to name each of the plurality of draft data stores. In particular, this can include drafts-account-updates, drafts-dispute-evidence, drafts-support, drafts-unauthorized-transaction, drafts-SSN, etc. (Note that for naming final data stores, the naming can include the prefix "document" instead of "drafts." To illustrate, if the secure document system 102 names the draft data store "drafts-account-updates" then the secure document system 102 names the final data store corresponding with the draft data store "documents-account-updates.") To further illustrate the above discussion, draft data stores named "drafts-dispute-evidence" may require files with the word "receipt" in the file name.

Additionally, the secure document system 102 can assign different names to draft data stores based on the type of environment the draft data store is deployed for. For example, depending on if the secure document system 102 uses a draft data store in a non-product or product environment, then the secure document system 102 adds a suffix such as -test, -dev, or -prod. In particular, depending on the environment designation, the draft data store can have different expiration times. The secure document system 102 can determine that files on the draft data stores named -dev do not have an expiration time. While the secure document system 102 can determine that files on the draft data stores named -prod expire after 30 minutes.

Moreover, in relation to naming files in draft data stores, the draft data stores have a unique key to identify the files within the draft data stores. In one or more implementations, the secure document system 102 uses the unique key for identification of a file (but does not expose the unique key to the client device). The secure document system 102 can use the first 2 units of the unique key to generate naming prefixes and can use the unique key as a representation (e.g., a content category of the file, file size, file type, etc.) of the file stored in it. Typically, the unique key used to identify a file correlates with attributes of the draft data store of the file. To illustrate, the secure document system 102 can use the unique key as a path directory to locate the file within a draft data store. This aids in reducing the processing power for locating files. (Note that the unique key discussed here is different from the unique identifier discussed in FIG. 2. The unique identifier in FIG. 2 identifies the secure document system's 102 record of the upload request in a database).

The secure document system 102 can set file content requirements for draft data stores uniformly or it can vary file content requirements amongst different draft data stores. In one or more implementations, file content attributes can include analyzing a .JPEG file. In particular, analyzing the .JPEG file can include determining the clearness/blurriness of the file, determining that the file is not empty, determining that the .JPEG file includes a picture ID, an SSN number, etc. To illustrate, the secure document system 102 can use a machine learning model trained for analyzing images and files. The secure document system 102 can set a requirement that a draft data store includes the file content requirement of "a picture ID." In this example, the secure document system 102 can analyze the file and if the file does not contain the file content requirement, the secure document system 102 can send a notification to the client device to upload another file. The secure document system 102 can determine to have any number of the aforementioned predetermined file attributes for each draft data store.

As illustrated in FIG. 3, the first draft data store 300 has the first set of predetermined file attributes 312 of file size: X, file type: A, file name: N, and file content: L. The second draft data store 302 has the second set of predetermined file attributes 314 with file size: X, file type: B, and file name: M. Whereas the third draft data store 304 has a third set of predetermined file attributes 316 with file size: Y, file type: C, file name: Z, file content: P. As an example, the secure document system 102 names the first draft data store 300 "drafts-unauthorized-transaction-prod."

The first draft data store 300 with the name "drafts-unauthorized-transaction-prod" has a first set of predetermined file attributes where the "file type: A" can represent JPEG files or PDF files. In particular the secure document system 102 can set the file type to JPEG and PDF files because receiving documentation relating to unauthorized transaction often includes PDF or JPEG files of receipts, or pictures of transactions. Allowing PDF files allows for more flexibility.

The secure document system 102 can set "file size: X" to <20 MB. A file size limit of 20 MB can include for example, an aggregate size of files uploaded or the limit for each individual file. For aggregate file sizes, the secure document system 102 can set the limit higher to account for more documents (e.g., <100 MB). The secure document system 102 can set the "file name: N" to include at least one of receipt, unauthorized, order, and transaction. In particular the secure document system 102 can set the file name requirements to correspond to the name of the draft data store. To illustrate, each prefix or suffix of the naming for a draft data store can have associated words included in the requirements assigned to each draft data store. Alternatively, the secure document system 102 can eliminate any file name requirement. Whereas the secure document system 102 can set the file content: L as requiring an image of a receipt.

As illustrated in FIG. 3, the second set of predetermined file attributes 314 overlaps with the first set of predetermined file attributes 312 for file size. This can indicate that the second draft data store 302 receives similar files as the first draft data store 300. For example, the secure document system 102 may have named the second draft data store 302 "drafts-unauthorized-transaction-dev." Because the secure document system 102 designates the environment as "dev" the "file type: B" and "file name: M" may be less restrictive. Lastly, as illustrated, the third set of predetermined file attributes 316 has different requirements from the first set of predetermined file attributes 312 and the second set of predetermined file attributes 314. For example, the secure document system 102 may have named the third draft data store 304 "drafts-change-of-name-updates-prod" and as such has different requirements.

As discussed above, the secure document system 102 can transfer the file from the draft data store into a final data store. As illustrated in FIG. 4, the secure document system 102 transfers the file 402 when certain requirements are satisfied. Specifically, FIG. 4 shows a client device 409 uploading the file 402 to a draft data store 406 via a device application 404. The secure document system 102 performs an act 408 of processing predetermined file attributes and determines whether the requirements are satisfied.

As previously discussed in FIG. 3, the secure document system 102 stores the file 402 in the draft data store 406 based on the file 402 fulfilling predetermined file attributes established for the draft data store 406. For example, the secure document system 102 initially receives the file 402 in the draft data store 406 based on the metadata content category discussed above. After upload to the draft data store 406, the secure document system 102 processes the file 402 prior to transferring to a final data store (e.g., final data store 214 as discussed in FIG. 2).

As mentioned above, the secure document system 102 processes predetermined file attributes. For example, these predetermined file attributes include a file size threshold 410, a file name 412, a file type 414, and file content 415 (as discussed in FIG. 3). In particular, the act 408 of processing predetermined file attributes, as discussed above, depends on the draft data store. To illustrate, the secure document system 102 can have the file size threshold 410 set at <20 MB, the file name 412 at contains "receipt" or "unauthorized." The file type 414 can include file types such as ".doc," ".pdf," ".gif," ".JPEG," ".PNG," etc. (the file type 414 can also just exclude .exe files). While the file content 415 can analyze the file for an image of a receipt.

As discussed above, the secure document system 102 determines whether the processing requirements are satisfied by performing the act 408 of processing the predetermined file attributes. For example, the secure document system 102 can determine that the predetermined file attributes are satisfied and perform an act 418 of transferring the file 402 to the final data store. In particular, the secure document system 102 can only require satisfaction of half of the predetermined file attributes or it can only require file type 414 attribute as the only necessary file attribute.

The secure document system 102 performing the act 418 of transferring the file 402 to the final data store, can occur for example, by the secure document system 102 copying the objects from the file 402 in the draft data store 406 into the final data store. In particular, when the secure document system 102 copies the objects from the file 402 to the final data store, the secure document system 102 can then send a notification to corresponding agent devices assigned to oversee certain predetermined file attributes. To illustrate, if the file 402 transferred to the final data store involves a disputed transaction, then the agent device team overseeing disputed transaction receives a notification of a new file transferred to the final data store.

In one or more implementations, the notification sent to agent devices in response to the secure document system 102 transferring the file 402 to the final data store can include predetermined file attributes, time of transfer, support ticket ID, information needed to access the file, etc. In particular, an agent device can subscribe to certain final data stores. Accordingly, a subscription to a final data store would immediately notify an agent device when the secure document system transfers a file to that final data store.

In one or more implementations, final data stores can contain many queues. In particular, a final data store for "disputed transactions" can include queues for "unauthorized transactions," "ATM withdrawals," "ACH transfers," "incorrect amount," "returned item," etc. An agent device can specifically subscribe to a certain queue within the final data store and only receive notifications for that queue. To illustrate, if the agent device subscribes to "ATM withdrawals" the agent device will not receive a notification when the secure document system 102 transfers a file to the "unauthorized transactions" queue. The secure document system 102 can also utilize blob URLs to notify agent devices regarding uploaded files. Moreover, the agent device that receives a notification from the secure document system 102 regarding a transferred file to a final data store can create a support ticket directly from the notification.

When the secure document system 102 determines that the predetermined file attributes are not satisfied, then the secure document system 102 performs an act 416 of not transferring the file 402 to the final data store. For example, if the secure document system 102 identifies the file 402 as a .exe file then the secure document system 102 does not transfer the file 402. In this instance, the secure document system 102 can notify the client device 409 to upload another file. Alternatively, the secure document system can notify the agent device associated with the failed transfer to contact the client device 409. Moreover, the secure document system 102 can immediately remove the file 402 from the draft data store 406.

Having different data stores (a draft data store and a final data store) reduces the number of malicious files accessed by agent devices because the secure document system 102 can require that only files in the final data stores can be accessed by agent devices. Accordingly, processing prior to transferring files to the final data store increases security and accuracy of the secure document system 102.

Although FIG. 4 illustrates the method of performing the act 408, these events can occur in a variety of ways. In one or more implementations, the secure document system 102 may allow client device 409 direct uploads of the file 402 to a final data store rather than the draft data store 406. In particular, the secure document system 102 can directly allow the client device 409 to upload to the final data store in the rare situation that a file uploaded by the client device 409 does not match any of the predetermined file attributes of the plurality of draft data stores.

In another example implementation, the secure document system has a plurality of draft data stores each with different predetermined file attributes, but only a single final data store. In particular, the secure document system 102 can still perform the act 408 of processing predetermined file attributes (based on the draft data store predetermined file attributes) but instead of transferring the file 402 to a final data store corresponding with the draft data store, there is a single final data store that receives all files from the draft data stores.

Figure 5:
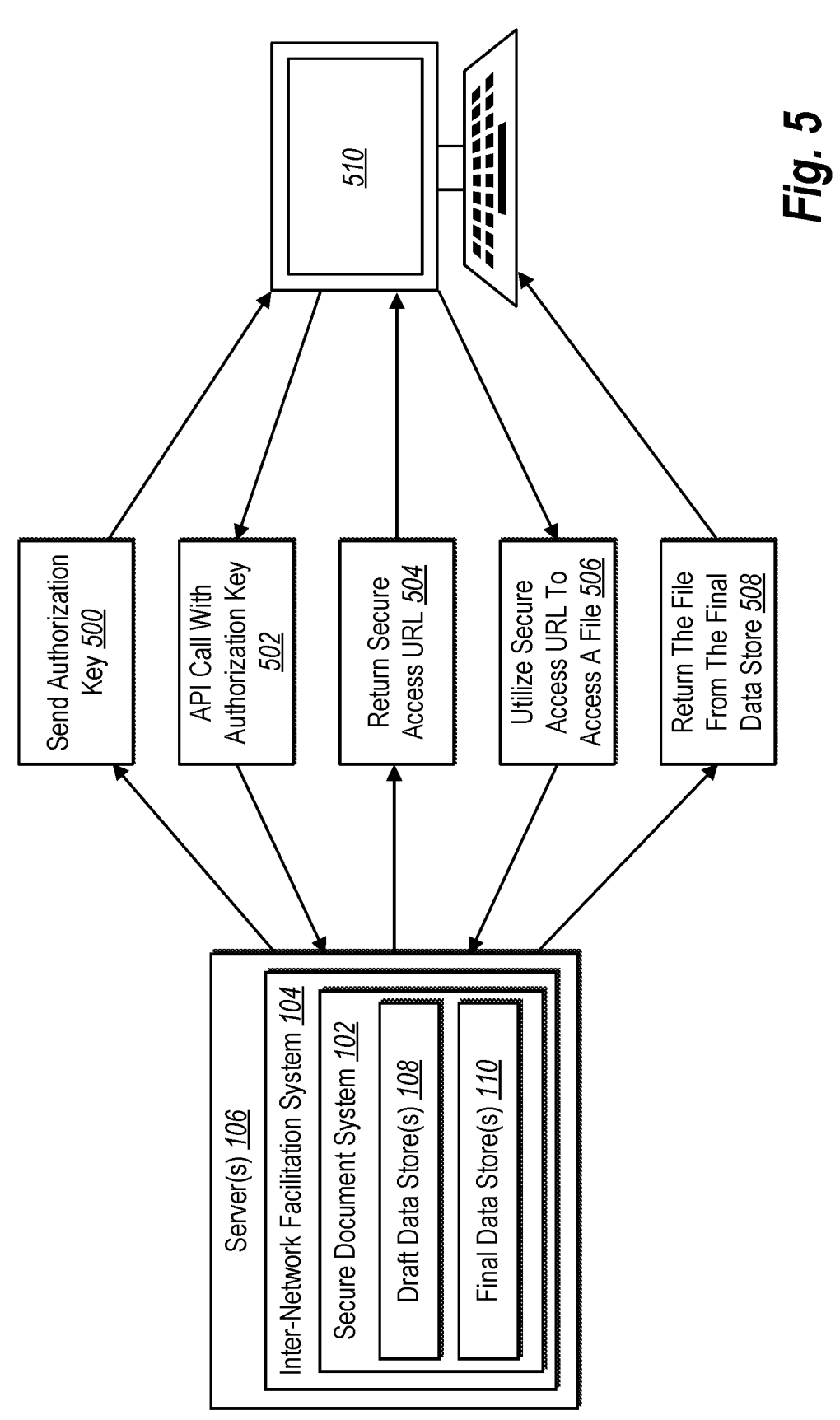
FIG. 5 illustrates an example diagram of a providing an authorization key to an agent device in accordance with one or more embodiments.

As discussed, the secure document system 102 approves agent devices to access files in final data stores. As shown in FIG. 5, the secure document system 102 provides access to agent devices through sending an authorization key 500. Specifically, FIG. 5 shows the server(s) 106 including the inter-network facilitation system 104, secure document system 102, draft data store(s) 108, and final data store(s) 110. The aforementioned elements send and receive components to an agent device 510. To further illustrate, FIG. 5 shows the secure document system 102 sending the authorization key 500 to the agent device 510. In response, the agent device 510 uses an API call 502 with the authorization key 500. The secure document system 102 then returns a secure access URL 504 and the agent device 510 utilizes the secure access URL 504 to access a file 506. The secure document system 102 then returns the file from a final data store 508 to the agent device 510.

For example, as used herein, the term "authorization key" 500 refers to a method for identifying the file 506 and the file's storage location, i.e., the final data store 508. In particular, the agent device 510 with the authorization key 500 can indicate to the secure document system 102 that the agent device 510 is authorized to access the corresponding file 506. To illustrate, the agent device 510 can use the authorization key 500 within an API call to retrieve the file 506. More particularly, the agent device 510 places the authorization key 500 within the header of a GET call.

In one or more implementations, the agent device 510 receives the authorization key from the secure document system 102. In particular, the agent device 510 receives the authorization key immediately following transfer of the file 506 into the final data store 508. To illustrate, the secure document system 102 can send a notification to the agent device 510 containing the authorization key and instructions on how to utilize the authorization key within an API call.

As mentioned above, the secure document system 102 returns the secure access URL 504 in response to the API call with the authorization key 500. For example, the secure document system receives via an API endpoint a GET request for the file 506. In particular, the secure document system 102 checks the GET request for the correct authorization key and returns the secure access URL 504 to the agent device 510. To illustrate, the secure document system 102 creates the authorization key 500 as: "rec2l6u6fic6lqxdsogedkb66qu5". In the draft data store(s) 108, the secure document system 102 designates the authorization key 500 as: "drafts account updates/r/e/rec2l6u6fic6lqxdsogedkb66qu5". While in the final data store(s) 110, the secure document system 102 designates the authorization key 500 as: "documents account updates/r/e/ rec2l6u6fic6lqxdsogedkb66qu5/original". To view a thumbnail of the file 506, the agent device 510 can use thumbnail: "documents account updates/r/e/ rec2l6u6fic6lqxdsogedkb66qu5/thumbnail".

In one or more implementations the secure access URL 504 to access the file 506 expires. In particular, the secure document system 102 can set the expiration time to 5 minutes. To illustrate, if the agent device 510 receives the secure access URL 504 but does not utilize the secure access URL 504 within the allotted 5 minutes, then the agent device 510 would need to make another API call for another secure access URL.

In one or more implementations, the secure document system 102 sets the secure access URL 504 to expire after a single use. In particular, the secure document system 102 does not set a time limit in which the agent device 510 must use the secure access URL 504, but rather after the agent device 510 has utilized the secure access URL 504 once, then it expires.

As discussed above, the secure document system 102 returns the file 506 to the agent device 510 from the final data store 508. In one or more example embodiments, the secure document system 102 can adjust files. In particular, the secure document system 102 can resize large image files (e.g., JPEG) in response to an analysis of the file content. The resizing can occur to optimize the agent device's experience (e.g., agent device 202 as discussed in FIG. 2). The secure document system 102 can resize based on agent device specifications or preset optimization specifications. To illustrate, if the agent device 510 indicates that it wants to view the image file in black and white, view the image file at a certain resolution, or view the image file at a certain size, the secure document system 102 returns the image file according to those specifications.

In one or more implementations, after the agent device 510 has accessed the file 506, the secure document system 102 can determine whether to retain the file 506 on the final data store(s) 110. In particular, the secure document system 102 can receive an update from the agent device 510 regarding the status of the file 506. To illustrate, in response to the update from the agent device 510, the secure document system 102 can determine to delete the file 506, retain the file 506, or send a notification to another agent device.

In one or more implementations, the secure document system 102 has a set time for removing files from the final data store(s) 110. In particular, the secure document system 102 can set a time of 30 days before removing files from the final data store(s) 110. To illustrate, the secure document system 102 can have an established time of 30 days, but the secure document system can identify sensitive files (e.g., sensitive files can include dispute requests and account update information), and as soon as the documents have served their purpose, the secure document system 102 removes them from the draft data store(s) 108. Alternatively, for files not considered sensitive, the secure document system 102 can archive the files in an archive data store.

Figure 6:
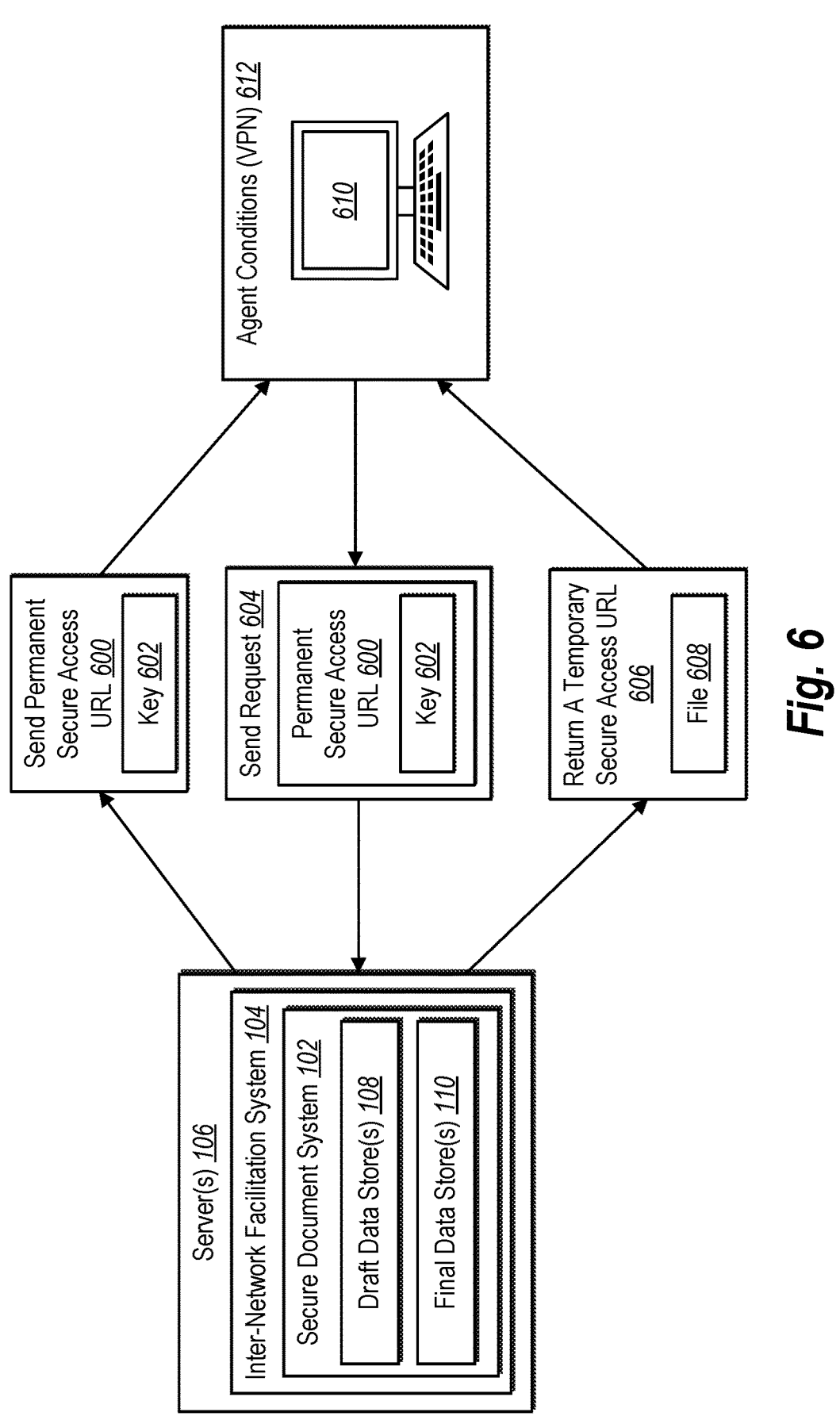
FIG. 6 illustrates an example diagram of a providing a permanent secure access URL to an agent device in accordance with one or more embodiments.

As discussed above, the secure document system 102 can send a permanent secure access URL to an agent device. As shown in FIG. 6, the secure document system 102 sends a permanent secure access URL 600 to an agent device 610. Specifically, FIG. 6 shows the server(s) 106 including the inter-network facilitation system 104, secure document system 102, draft data store(s) 108, and final data store(s) 110. The aforementioned elements send and receive components to the agent device 610. To further illustrate, FIG. 6 shows the secure document system 102 sending the permanent secure access URL 600 with a key 602 to the agent device 610 that satisfies agent conditions 612. The agent device 610 then sends a request 604 to the secure document system 102 with the permanent secure access URL 600 and the key 602. The secure document system 102 then returns a temporary secure access URL 606 with a file 608 to the agent device 610.

The secure access URL and the permanent secure access URL 600 are discussed above. The process of the agent device 610 receiving the permanent secure access URL 600 varies from FIG. 5 because, for example, the secure document system 102 identifies whether the agent device 610 satisfies agent conditions 612. In particular, the permanent secure access URL 600 contains the key 602 discussed in FIG. 5 (e.g., authorization key 500). To illustrate, rather than receiving the key 602 and using the key 602 in an API call, the agent device 610 can simply select the permanent secure access URL 600. As indicated by the name, the permanent secure access URL 600 does not expire.

In one or more implementations, the secure document system 102 generates the permanent secure access URL 600 in response to the secure document system 102 storing the file 608 within the final data store(s) 110. In particular, the permanent secure access URL includes a URL attribute with the file's 608 unique ID (e.g., key), a signed ID, and the permanent secure access URL points to the secure document system 102 and server(s) 106.

In one or more implementations, the secure document system 102 uses the permanent secure access URL 600 for the file 608 as a publicly accessible redirect link. In particular, the permanent secure access URL 600 points to the server(s) 106 of the secure document system 102 and every request via the permanent secure access URL 600 returns the file 608 if agent conditions 612 or other rules and policies established by the secure document system 102 are satisfied. Moreover, as an extra security precaution, the secure document system 102 can require the key 602 along with the permanent secure access URL 600 (i.e., in response to selecting the permanent secure access URL 600, the secure document system requests for proof of the key 602).

As discussed above, when the agent device 610 sends the request 604 with the permanent secure access URL 600 and key 602, the secure document system 102 verifies that file 608 qualifies for redirection. For example, some sensitive files do not qualify for redirection. In particular, if the file 608 qualifies for redirection, the secure document system 102 ensures that agent conditions 612 are satisfied (agent conditions 612 are discussed above. To illustrate, FIG. 6 shows an agent condition of VPN).

Accordingly, if the file 608 qualifies for redirection and the agent conditions 612 are satisfied, the secure document system 102 sends the temporary secure access URL 606 (the temporary secure access URL 606 can expire within a short time, i.e., 5 minutes). The temporary secure access URL 606 gives the agent device 610 access to file 608. Alternatively, if the file 608 does not qualify for redirection, then the secure document system 102 returns an error response.

Figure 7:
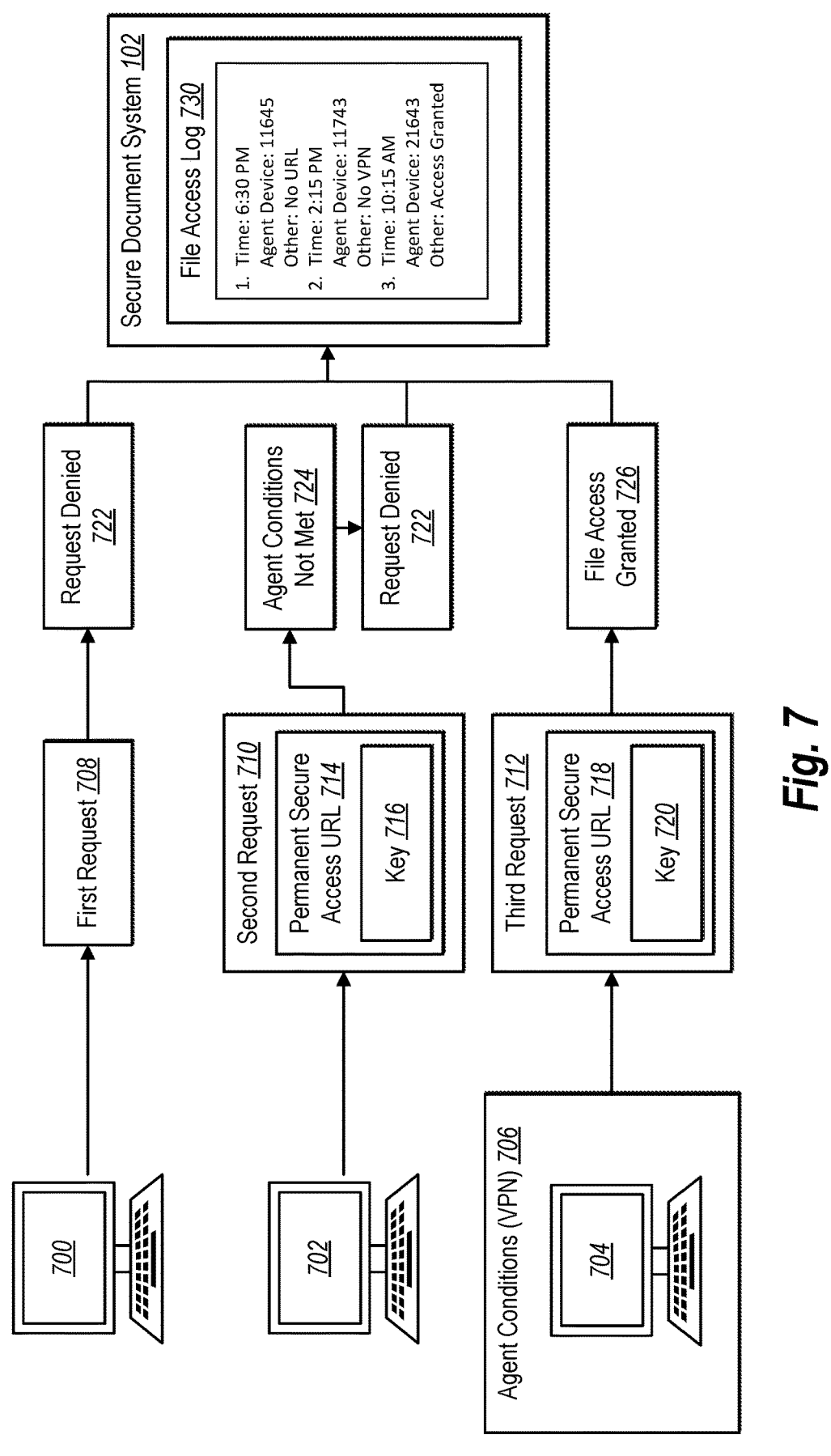
FIG. 7 illustrates an example diagram of logging file access of agent devices in accordance with one or more embodiments.

As discussed above, the secure document system 102 can log file access. As shown in FIG. 7, the secure document system 102 utilizes a file access log 730. Specifically, FIG. 7 shows three agent devices sending requests to the secure document system 102 and the secure document system 102 logging the requests.

To further illustrate, FIG. 7 shows a first agent device 700, a second agent device 702, and a third agent device 704. The first agent device 700 sends a first request 708 while the second agent device 702 sends a second request 710 that includes a permanent secure access URL 714 and a key 716. The third agent device 704 sends a third request 712 with a permanent secure access URL 718 and key 720. The third agent device 704 also satisfies agent conditions 706 via the use of a VPN. The secure document system 102 performs an act 722 of denying the first request 708 and the second request. While the secure document system 102 performs an act 726 of granting file access for the third request 712. Subsequently the file access log 730 records all the aforementioned requests.

As discussed above, the first agent device 700 sends a first request 708 which the secure document system 102 denies. In one or more implementations, the secure document system 102 denies the first request 708 because the request lacks a permanent secure access URL and/or a key. In particular, a request without a permanent secure access URL and/or a key constitutes unauthorized access. To illustrate, the first agent device 700 attempts to view files within a final data store for "personal ID" and as such the secure document system 102 records the time of unauthorized access, the agent device ID, and the reason for unauthorized access.

In one or more implementations, the second agent device 702 sends the second request 710 but the secure document system 102 denies the second request 710. In particular, the second request 710 includes the permanent secure access URL 714 and the key 716 but does not satisfy agent conditions 724. To illustrate, the second agent device 702 has authorization to access a file but the secure document system identifies that the second agent device 702 is not using a VPN. As such the secure document system 102 records the time of access, the agent device ID, and the reason for denial: "no VPN."

In one or more implementations, the third agent device 704 sends the third request 712 and the secure document system 102 performs the act 726 of granting file access. In particular, the third request 712 includes the permanent secure access URL 718, the key 720 and also satisfies agent conditions 706. To illustrate, the third agent device 704 uses a VPN when sending the third request 712 which contains the valid permanent secure access URL 718 with the key 720 and as such the secure document system 102 grants file access. Moreover, the secure document system 102 records the time of access, the agent device ID, and file access granted.

In one or more implementations, when the secure document system 102 denies the request, in addition to logging to file access attempt, the secure document system 102 can notify another agent device regarding the failed access attempt. In particular, the other agent device notified can include a supervising agent device.

Figure 8:
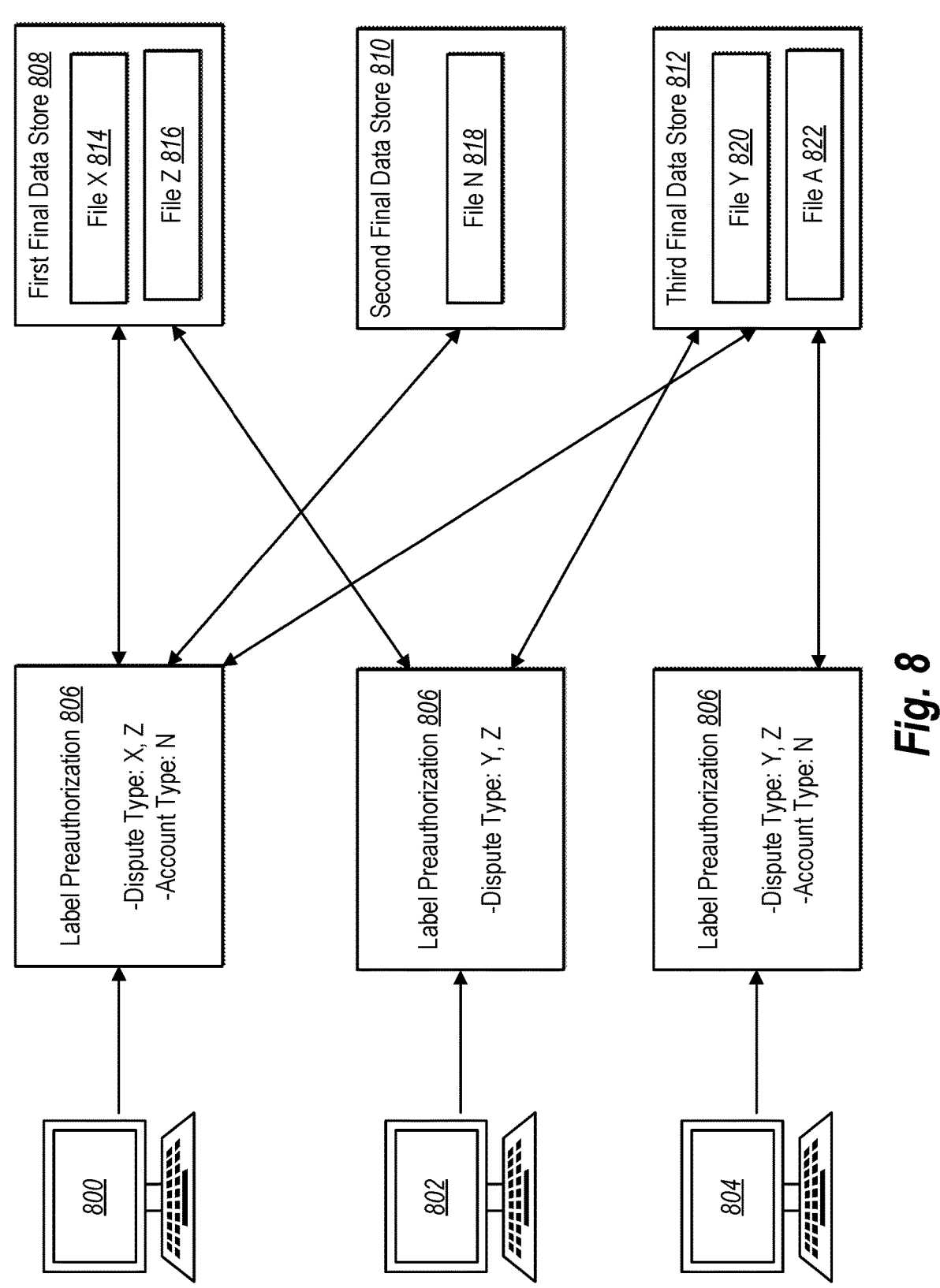
FIG. 8 illustrates an example diagram of pre-authorization of agent devices in accordance with one or more embodiments.

As discussed above, the secure document system 102 can label files and grant access to agent devices based on label preauthorization. For instance, as shown in FIG. 8, the secure document system 102 grants access to a first agent device 800 via label preauthorization 806. Specifically, FIG. 8 shows the first agent device 800 with a specific label preauthorization, and the first agent device 800 accesses different files in final data stores based on the label preauthorization.

To further illustrate, FIG. 8 shows the first agent device 800 with label preauthorization 806 of "dispute type: X, Z" and "account type: N". Accordingly, the first agent device 800 can access file X 814, file Z 816, and file N 818. A second agent device 802 has the label preauthorization 806 of "dispute type: Y, Z". Accordingly, the second agent device 802 can access file Y 820 and file Z 816. While a third agent device 804 has the label preauthorization 806 of "dispute"

type: Y, Z" and "account type: N". Accordingly, the third agent device 804 can access file Y 820, file Z 816 and file N 818. Moreover, FIG. 8 illustrates a first final data store 808, a second final data store 810, and a third final data store 812.

As mentioned, the secure document system 102 can grant access to files via label pre-authorization for each agent device. In one or more implementations, the secure document system 102 grants label preauthorization 806 to agent devices based on subject matter they oversee. In particular, if the first agent device 800 oversees "returned items" and "unauthorized transactions" (i.e., dispute requests) then the secure document system 102 assigns preauthorization labels corresponding to those two categories. To illustrate, the secure document system 102 preauthorizes an agent device by embedding an authorization key for all files labeled "returned items" and "unauthorized transactions" within the agent device's application interface for accessing files. As discussed above, the secure document system 102 identifies draft data stores to upload a file into based on metadata content categories. Furthermore, the secure document system 102 processes files in the draft data stores based on predetermined file attributes.

In one or more implementations, post-processing, the secure document system 102 transfers the files into final data stores, and depending on the predetermined file attributes, the secure document system 102 labels each file transferred into final data stores. In particular, the first final data store 808 relates to unauthorized transactions. To illustrate, the first final data store 808 receives file 814 and labels file 814 "X." The X label in this instance can mean "returned items." More particularly, the file X 814 is labeled X based on it representing a file of a merchant receipt. Whereas file 816 is labeled "Z" because relates to a PDF file of a merchant email correspondence. Accordingly, as shown in FIG. 8, multiple agent devices (800-804) can access the same files as long as the secure document system 102 authorizes the agent devices. In particular, the first agent device 800 and the second agent device 802 can both access the "Z" label.

While FIG. 9 illustrates acts according to some embodiments, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9. Additionally, the acts described herein may be repeated or performed in parallel with one another or in parallel with different instances of the same or other similar acts.

FIG. 9 illustrates an example series of acts 900 for facilitating providing access to an agent device via a secure document system. The series of acts 900 can include an act 902 of receiving, from a client device, an upload request comprising information associated with a file. In addition, the act 902 can include, identifying the first draft data store from a plurality of draft data stores based on a content category identified within the upload request.

As shown, the series of acts 900 can also include an act 904 of based at least in part on the information associated with the file, generating a secure upload URL. Further, the act 904 can include. The act 904 can further include generating the secure upload URL to expire after a predetermined period.

As shown, the series of acts 900 can also include an act 906 of providing the secure upload URL to the client device for the client device to upload the file to a first draft data store. In addition, the act 906 of providing, can include providing a second secure upload URL for the client device to upload a second file to the first draft data store.

As shown, the series of acts 900 can also include an act 908 of transferring the file from the first draft data store to a first final data store based on the file meeting predetermined file attributes associated with the first draft data store. The act 908 of transferring can include, wherein the predetermined file attributes associated with the first draft data store are different from predetermined file attributes associated with a second draft data store. In addition, the act 908 can include, determining the second file does not meet the predetermined file attributes associated with the first draft data store by determining a file name, a file size, file content, or a file type does not satisfy the predetermined file attributes associated with the first draft data store and preventing transfer of the second file into the first final data store. Furthermore, the act 908 includes creating a duplicate file based on the file, transferring the duplicate file to the first final data store, and removing the file from the first draft data store after a predetermined period.

As shown, the series of acts 900 can also include an act 910 of providing, to an agent device, access to the file based on access permissions corresponding to the first final data store. Further, the act 910 can include providing to the agent device an authorization key for making API calls, receiving an API call from the agent device with an indication of the authorization key, and returning a secure access URL to the agent device to provide access to the file. Additionally, the act 910 can include providing access to the agent device based on access permissions of the first final data store comprises providing the agent device with a permanent secure access URL and a key that indicates a storage location of the first final data store.

The act 910 also includes assigning agent conditions to the first final data store. Further, the act 910 includes receiving, from a second agent device, a request to access the file via a permanent secure access URL, identifying for the second agent device, the agent conditions for the first final data store, and providing file access to the second agent device when the second agent device satisfies the agent conditions. The act 910 also includes receiving a request from the agent device for access to the file in the first final data store, providing the file to the agent device based on the agent device satisfying permissions corresponding to the first final data store, and logging access of the file by the agent device. Moreover, the act 910 includes generating a label for the file on the first final data store based on file name, file size, file type, or content category, and providing, to the agent device, access to the file on the first final data store based on the agent device being pre-authorized to access the label.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
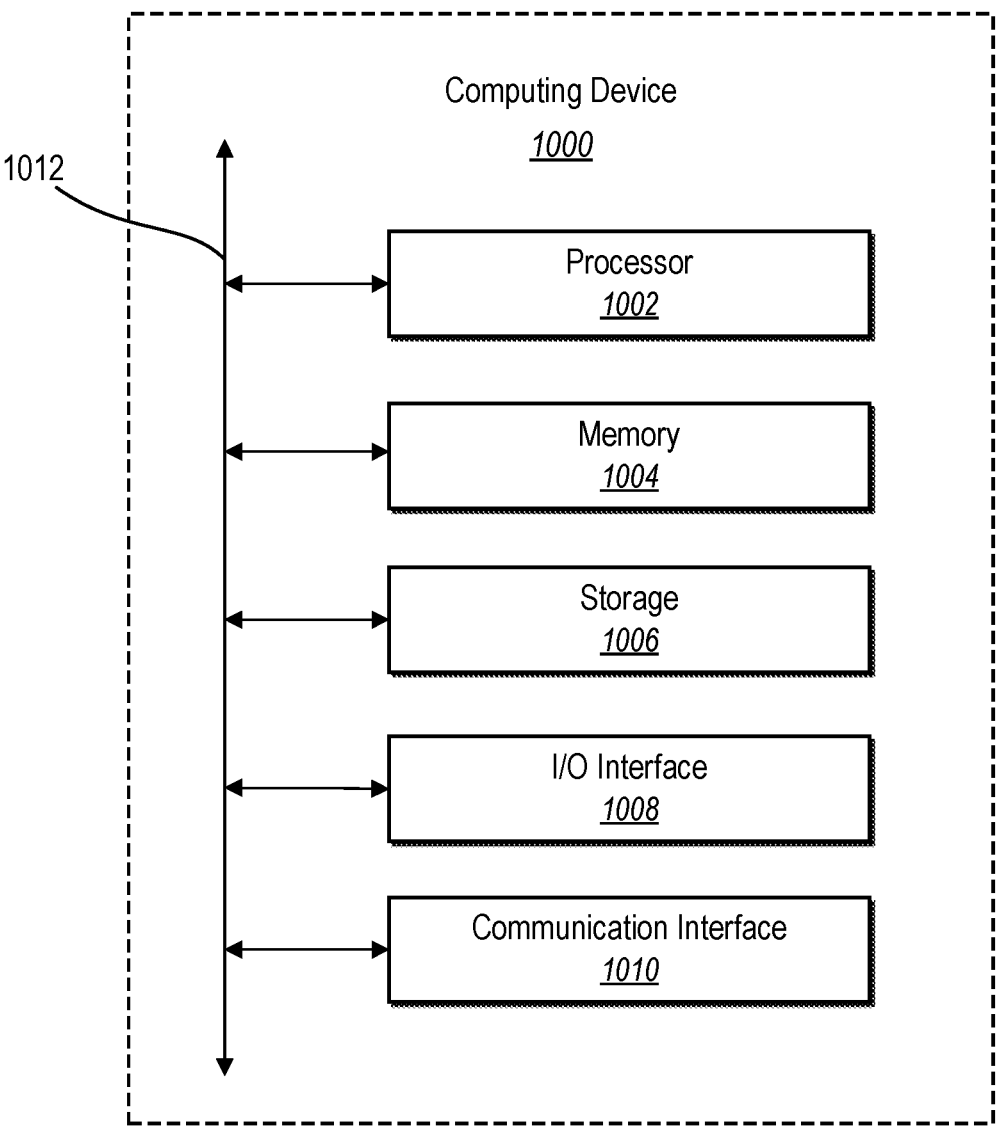
FIG. 10 illustrates a block diagram of a computing device for implementing one or more embodiments of the present disclosure.

FIG. 10 illustrates, in block diagram form, an exemplary computing device 1000 (e.g., the client device 116, or the server(s) 106) that may be configured to perform one or more of the processes described above. As shown by FIG. 10, the computing device can comprise a processor 1002, memory 1004, a storage device 1006, an I/O interface 1008 interface 1008, and a communication interface 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, storage device 1006 can comprise a non-transitory storage medium described above. The storage device 1006 may include a hard disk drive ("HDD"), flash memory, a Universal Serial Bus ("USB") drive or a combination of these or other storage devices.

The computing device 1000 also includes one or more input or output interface 1008 interface 1008 (or "I/O interface 1008"), which are provided to allow a user (e.g., requester or provider) to provide input to (such as user strokes), receive output from, and otherwise transfer data to and from the computing device 1000. These I/O interface 1008 may include a mouse, keypad or a keyboard, a touch screen, camera, optical scanner, network interface, modem, other known I/O devices or a combination of such I/O interface 1008. The touch screen may be activated with a stylus or a finger.

The I/O interface 1008 may include one or more devices for presenting output to a user, including, but not limited to, a graphics engine, a display (e.g., a display screen), one or more output providers (e.g., display providers), one or more audio speakers, and one or more audio providers. In certain embodiments, interface 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example, and not by way of limitation, communication interface 1010 may include a network interface controller ("NIC") or network adapter for communicating with an Ethernet or other wire-based network or a wireless NIC ("WNIC") or wireless adapter for communicating with a wireless network, such as a WI-FI. The computing device 1000 can further include a bus 1012. The bus 1012 can comprise hardware, software, or both that connects components of computing device 1000 to each other.

Figure 11:
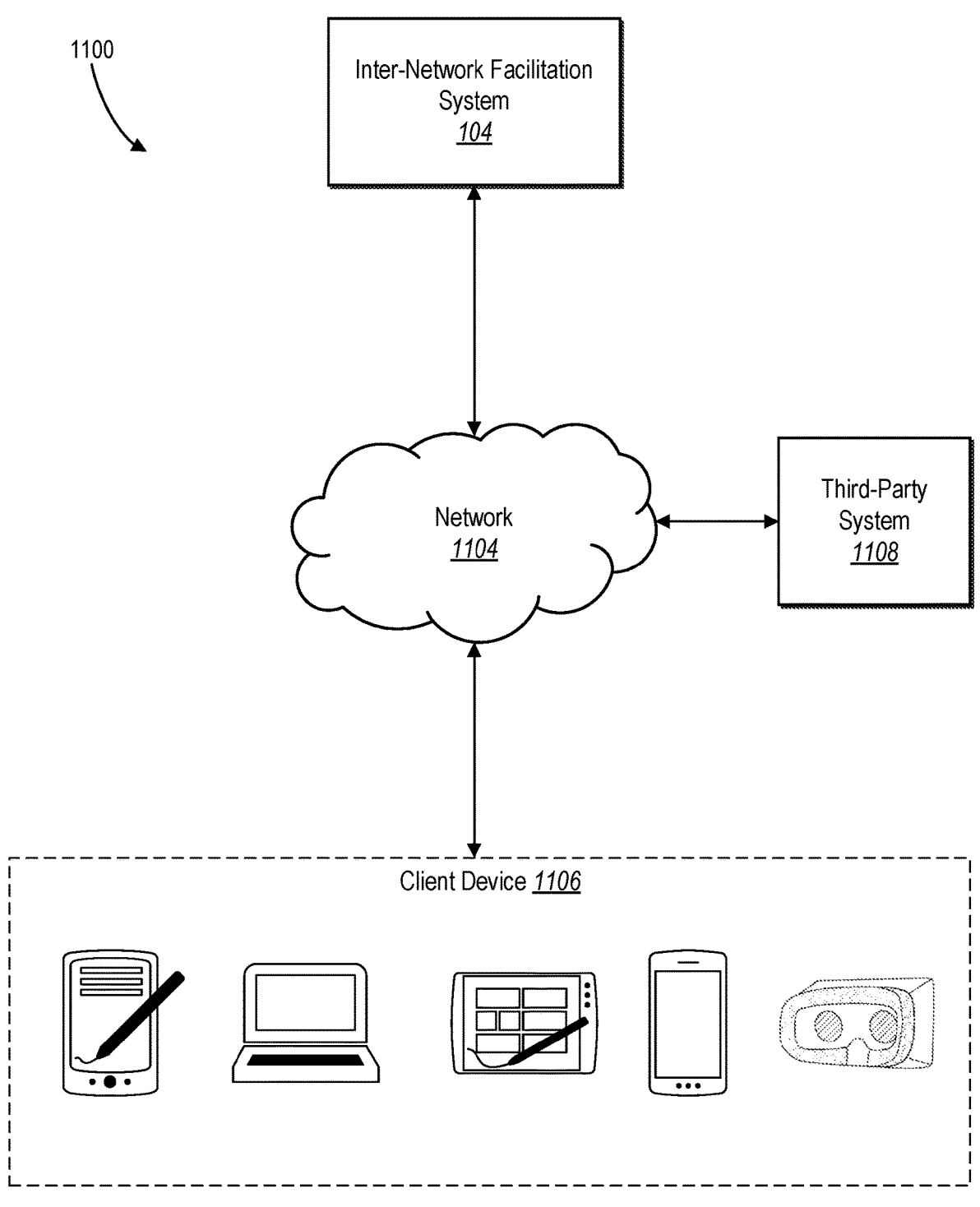
FIG. 11 illustrates an example environment for the secure document system in accordance with one or more embodiments.

FIG. 11 illustrates an example network environment 1100 of the inter-network facilitation system 104. The network environment 1100 includes a client device 1106 (e.g., client device 116), an inter-network facilitation system 104, and a third-party system 1108 connected to each other by a network 1104. Although FIG. 11 illustrates a particular arrangement of the client device 1106, the inter-network facilitation system 104, the third-party system 1108, and the network 1104, this disclosure contemplates any suitable arrangement of client device 1106, the inter-network facilitation system 104, the third-party system 1108, and the network 1104. As an example, and not by way of limitation, two or more of client device 1106, the inter-network facilitation system 104, and the third-party system 1108 communicate directly, bypassing network 1104. As another example, two or more of client device 1106, the inter-network facilitation system 104, and the third-party system 1108 may be physically or logically co-located with each other in whole or in part.

Moreover, although FIG. 11 illustrates a particular number of client devices 1006, inter-network facilitation systems 104, third-party systems 1108, and networks 1104, this disclosure contemplates any suitable number of client devices 1106, inter-network facilitation system 104, third-party systems 1108, and networks 1104. As an example, and not by way of limitation, network environment 1100 may include multiple client device 1106, inter-network facilitation system 104, third-party systems 1108, and/or networks 1104.

This disclosure contemplates any suitable network 1104. As an example, and not by way of limitation, one or more portions of network 1104 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1104 may include one or more networks 1104.

Links may connect client device 1106 and third-party system 1108 to network 1104 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1100. One or more first links may differ in one or more respects from one or more second links.

In particular embodiments, the client device 1106 may be an electronic device including hardware, software, or embedded logic components or a combination of two or more such components and capable of carrying out the appropriate functionalities implemented or supported by client device 1106. As an example, and not by way of limitation, a client device 1106 may include any of the computing devices discussed above in relation to FIG. 11. A client device 1106 may enable a network user at the client device 1106 to access network 1104. A client device 1106 may enable its user to communicate with other users at other client devices 1106.

In particular embodiments, the client device 1106 may include a requester application or a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at the client device 1106 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1106 one or more Hyper Text Markup Language ("HTML") files responsive to the HTTP request. The client device 1106 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 1104) to link the third-party-system 1108. For example, the inter-network facilitation system 104 may receive authentication credentials from a user to link a third-party system 1108 such as an online bank account, credit account, debit account, or other financial account to a user account within the inter-network facilitation system 104. The inter-network facilitation system 104 can subsequently communicate with the third-party system 1108 to detect or identify balances, transactions, withdrawal, transfers, deposits, credits, debits, or other transaction types associated with the third-party system 1108. The inter-network facilitation system 104 can further provide the aforementioned or other financial information associated with the third-party system 1108 for display via the client device 1106. In some cases, the inter-network facilitation system 104 links more than one third-party system 1108, receiving account information for accounts associated with each respective third-party system 1108 and performing operations or transactions between the different systems via authorized network connections.

In particular embodiments, the inter-network facilitation system 104 may interface between an online banking system and a credit processing system via the network 1104. For example, the inter-network facilitation system 104 can provide access to a bank account of a third-party system 1108 and linked to a user account within the inter-network facilitation system 104. Indeed, the inter-network facilitation system 104 can facilitate access to, and transactions to and from, the bank account of the third-party system 1108 via a client application of the inter-network facilitation system 104 on the client device 1106. The inter-network facilitation system 104 can also communicate with a credit processing system, an ATM system, and/or other financial systems (e.g., via the network 1104) to authorize and process credit charges to a credit account, perform ATM transactions, perform transfers (or other transactions) across accounts of different third-party systems 1108, and to present corresponding information via the client device 1106.

In particular embodiments, the inter-network facilitation system 104 includes a model for approving or denying transactions. For example, the inter-network facilitation system 104 includes a transaction approval machine learning model that is trained based on training data such as user account information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 1108), the inter-network facilitation system 104 can utilize the transaction approval machine learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 1100 either directly or via network 1104. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1106, or an inter-network facilitation system 104 to manage, retrieve, modify, add, or delete, the information stored in data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system, which is separate from inter-network facilitation system 104 and coupled to the inter-network facilitation system 104 via a network 1104.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interfaces ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles for transportation providers and/or transportation requesters. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more client devices 1106. An action logger may be used to receive communications from a web server about a user's actions on or off the inter-network facilitation system 104. In conjunction with the action log, a third-party-content-object log may be maintained of user exposures to third-party-content objects. A notification controller may provide information regarding content objects to a client device 1106. Information may be pushed to a client device 1106 as notifications, or information may be pulled from client device 1106 responsive to a request received from client device 1106. Authorization servers may be used to enforce one or more privacy settings of the users of the inter-network facilitation system 104. A privacy setting of a user determines how particular information associated with a user can be shared. The authorization server may allow users to opt in to or opt out of having their actions logged by the inter-network facilitation system 104 or shared with other systems, such as, for example, by setting appropriate privacy settings. Third-party-content-object stores may be used to store content objects received from third parties. Location stores may be used for storing location information received from client devices 1006 associated with users.

In addition, the third-party system 1108 can include one or more computing devices, servers, or sub-networks associated with internet banks, central banks, commercial banks, retail banks, credit processors, credit issuers, ATM systems, credit unions, loan associates, brokerage firms, linked to the inter-network facilitation system 104 via the network 1104. A third-party system 1108 can communicate with the inter-network facilitation system 104 to provide financial information pertaining to balances, transactions, and other information, whereupon the inter-network facilitation system 104 can provide corresponding information for display via the client device 1106. In particular embodiments, a third-party system 1108 communicates with the inter-network facilitation system 104 to update account balances, transaction histories, credit usage, and other internal information of the inter-network facilitation system 104 and/or the third-party system 1108 based on user interaction with the inter-network facilitation system 104 (e.g., via the client device 1106). Indeed, the inter-network facilitation system 104 can synchronize information across one or more third-party systems 1108 to reflect accurate account information (e.g., balances, transactions, etc.) across one or more networked systems, including instances where a transaction (e.g., a transfer) from one third-party system 1108 affects another third-party system 1108.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

receiving, from a client device, an upload request comprising information associated with a file;

identifying a first draft data store from a plurality of draft data stores based on a content category identified within the upload request;

based at least in part on the information associated with the file, generating a secure upload URL to the first draft data store;

providing the secure upload URL to the client device for the client device to upload the file to the first draft data store;

transferring the file from the first draft data store to a first final data store based on the file meeting predetermined file attributes associated with the first draft data store; and providing, to an agent device, access to the file based on access permissions corresponding to the first final data store.

2. The computer-implemented method of claim 1, wherein the content category identified within the upload request is a content category from a set of content categories comprising disputed transactions, personal identification, or account updates.

3. The computer-implemented method of claim 2, wherein the predetermined file attributes associated with the first draft data store are different from predetermined file attributes associated with a second draft data store.

4. The computer-implemented method of claim 1, further comprising:

providing a second secure upload URL for the client device to upload a second file to the first draft data store;

determining the second file does not meet the predetermined file attributes associated with the first draft data store by determining a file name, a file size, file content, or a file type does not satisfy the predetermined file attributes associated with the first draft data store; and preventing transfer of the second file into the first final data store.

5. The computer-implemented method of claim 1, wherein transferring the file from the first draft data store to the first final data store comprises:

creating a duplicate file based on the file;

transferring the duplicate file to the first final data store; and removing the file from the first draft data store after a predetermined period.

6. The computer-implemented method of claim 1, further comprising generating the secure upload URL to expire after a predetermined period.

7. The computer-implemented method of claim 1, wherein providing access to the file based on the access permissions corresponding to the first final data store comprises:

providing to the agent device an authorization key for making API calls;

receiving an API call from the agent device with an indication of the authorization key; and returning a secure access URL to the agent device to provide access to the file.

8. A non-transitory computer-readable medium storing instructions that, when executed by at least one processor, cause a computer system to:

receive, from a client device, an upload request comprising information associated with a file;

identify a first draft data store from a plurality of draft data stores based on a content category identified within the upload request;

based at least in part on the information associated with the file, generate a secure upload URL to the first draft data store;

provide the secure upload URL to the client device for the client device to upload the file to the first draft data store;

transfer the file from the first draft data store to a first final data store based on the file meeting predetermined file attributes associated with the first draft data store; and provide, to an agent device, access to the file based on access permissions corresponding to the first final data store.

9. The non-transitory computer-readable medium of claim 8, wherein the content category identified within the upload request is a content category from a set of content categories comprising disputed transactions, personal identification, or account updates.

10. The non-transitory computer-readable medium of claim 9, wherein the predetermined file attributes associated with the first draft data store are different from predetermined file attributes associated with a second draft data store.

11. The non-transitory computer-readable medium of claim 8, further causing the computer system to:

provide a second secure upload URL for the client device to upload a second file to the first draft data store;

determine the second file does not meet the predetermined file attributes associated with the first draft data store by determining a file name, a file size, file content, or a file type does not satisfy the predetermined file attributes associated with the first draft data store; and prevent transfer of the second file into the first final data store.

12. The non-transitory computer-readable medium of claim 8, wherein providing access to the agent device based on access permissions of the first final data store comprises providing the agent device with a permanent secure access URL and a key that indicates a storage location of the first final data store.

13. The non-transitory computer-readable medium of claim of claim 12, further comprising assigning agent conditions to the first final data store.

14. The non-transitory computer-readable medium of claim 13, further causing the computer system to:

receive, from a second agent device, a request to access the file via the permanent secure access URL;

identify for the second agent device, the agent conditions for the first final data store; and provide file access to the second agent device when the second agent device satisfies the agent conditions.

15. A system comprising:

at least one processor; and at least one non-transitory computer-readable storage medium storing instructions that, when executed by the at least one processor, cause the system to:

receive, from a client device, an upload request comprising information associated with a file;

identify a first draft data store from a plurality of draft data stores based on a content category identified within the upload request;

based at least in part on the information associated with the file, generate a secure upload URL to the first draft data store;

provide the secure upload URL to the client device for the client device to upload the file to the first draft data store;

transfer the file from the first draft data store to a first final data store based on the file meeting predetermined file attributes associated with the first draft data store; and provide, to an agent device, access to the file based on access permissions corresponding to the first final data store.

16. The system of claim 15, wherein transferring the file from the first draft data store to the first final data store causes the system to:

create a duplicate file based on the file;

transfer the duplicate file to the first final data store; and remove the file from the first draft data store after a predetermined period.

17. The system of claim 15, further causing the system to generate the secure upload URL to expire after a predetermined period.

18. The system of claim 15 wherein providing access to the file based on the access permissions corresponding to the first final data store causes the system to:

provide to the agent device an authorization key for making API calls;

receive an API call from the agent device with an indication of the authorization key; and return a secure access URL to the agent device to provide access to the file.

19. The system of claim 15, wherein providing to the agent device, access to the file further causes the system to:

receive a request from the agent device for access to the file in the first final data store;

provide the file to the agent device based on the agent device satisfying permissions corresponding to the first final data store; and log access of the file by the agent device.

20. The system of claim 15, wherein the access permissions of the first final data store further causes the system to:

generate a label for the file on the first final data store based on file name, file size, file type, or content category; and provide, to the agent device, access to the file on the first final data store based on the agent device being preauthorized to access the label.

\* \* \* \* \*